United States Patent
Selcuk et al.

(10) Patent No.: US 8,383,284 B2
(45) Date of Patent: Feb. 26, 2013

(54) FUEL CELL

(75) Inventors: Ahmet Selcuk, Crawley (GB); Neill Maynard, Crawley (GB); Matthew Harrington, Crawley (GB); Karim El Koury, Crawley (GB); Andrew Baker, Crawley (GB); Bruce Girvan, Crawley (GB)

(73) Assignee: Ceres Intellectual Property Company Limited, West Sussex (GB)

( * ) Notice: Subject to any disclaimer, the term of this patent is extended or adjusted under 35 U.S.C. 154(b) by 70 days.

(21) Appl. No.: 12/162,784

(22) PCT Filed: Jan. 30, 2007

(86) PCT No.: PCT/GB2007/000299
§ 371 (c)(1),
(2), (4) Date: Dec. 8, 2008

(87) PCT Pub. No.: WO2007/085863
PCT Pub. Date: Aug. 2, 2007

(65) Prior Publication Data
US 2009/0226786 A1 Sep. 10, 2009

Related U.S. Application Data

(60) Provisional application No. 60/764,759, filed on Feb. 3, 2006.

(30) Foreign Application Priority Data

Jan. 30, 2006 (GB) .................................. 0601813.9

(51) Int. Cl.
*H01M 8/10* (2006.01)
*H01M 6/00* (2006.01)
(52) U.S. Cl. .................. 429/465; 429/467; 29/623.1

(58) Field of Classification Search .................... 429/30, 429/465
See application file for complete search history.

(56) References Cited

U.S. PATENT DOCUMENTS

| | | | | |
|---|---|---|---|---|
| 5,114,810 A * | 5/1992 | Frysz et al. | ................... | 429/219 |
| 2001/0049044 A1 | 12/2001 | Molter | | |
| 2003/0017377 A1 | 1/2003 | Diez | | |
| 2003/0072988 A1* | 4/2003 | Frisch et al. | .................... | 429/36 |
| 2005/0106450 A1* | 5/2005 | Castro et al. | .................... | 429/44 |
| 2009/0017354 A1* | 1/2009 | Yano et al. | ...................... | 429/27 |

FOREIGN PATENT DOCUMENTS

| | | |
|---|---|---|
| EP | 1 278 258 A2 | 1/2003 |
| EP | 1 135 821 B1 | 6/2003 |
| EP | 1 691 435 A1 | 8/2006 |
| EP | 1691435 A1 * | 8/2006 |
| JP | 2003-317743 A | 11/2003 |
| WO | WO 00/31815 A1 | 6/2000 |
| WO | WO 2005/050766 A1 | 6/2005 |
| WO | WO 2005/096419 A1 | 10/2005 |
| WO | WO 2006/014190 A1 | 2/2006 |

* cited by examiner

*Primary Examiner* — Patrick Ryan
*Assistant Examiner* — Brent Thomas
(74) *Attorney, Agent, or Firm* — Miles and Stockbridge P.C.

(57) ABSTRACT

The present invention is concerned with a fuel cell comprising: an electrolyte layer defining first and second faces and with said first face mounted on and in electrochemical contact with a first electrode and with said second face mounted on and in electrochemical contact with a second electrode, and an electrically conductive current collector joined to or mounted on or in said second electrode and in electrical contact with said second electrode, said electrically conductive current collector having an at least one extension extending outwards of a perimeter defined by said first and second electrodes and said electrolyte, fuel cell stack assemblies comprising same and methods of manufacture of same.

5 Claims, 12 Drawing Sheets

FUEL CELL

CROSS-REFERENCE TO RELATED APPLICATION

This application claims the benefit of U.S. Provisional Application No. 60/764,759 filed Feb. 3, 2006.

The present invention is concerned with improved current collectors for fuel cells, and fuel cells and fuel cell stack assemblies comprising same.

Fuel cells and fuel cell stack assemblies (which term includes stacks having one or more fuel cells) are designed such that current can be efficiently collected from the anode and cathode of each fuel cell. A fuel cell stack assembly typically comprises a plurality of fuel cells linked in series, the connection between adjacent fuel cells being established by an electrically conducting medium (a current collector) which connects an electrode (either an anode of cathode) of a first fuel cell to an adjacent interconnect plate which in turn is electrically connected to the opposing electrode (i.e. either a cathode or anode) of a second fuel cell. In order to ensure that the current flows in a controlled way through the stack via the current collectors without electrically shorting fuel cells in the stack, there is normally provided a non-conductive layer around the perimeter of each fuel cell layer that separates each fuel cell layer from the adjacent fuel cell layer or adjacent interconnect layers. The area of contact of the electrically conducting medium with the interconnect plate is generally parallel to and co-extensive with the area of contact of the electrically conductive medium with the electrode. Additional fuel cells are similarly connected. In order to provide a low electrical resistance connection for removing the fuel cell generated current, the connecting medium exerts a contact pressure over the contacted fuel cell surface, so ensuring the greatest area of electrical contact between the connecting medium and the electrode and so minimising the resistance of individual current flows.

The exertion of the contact pressure within a fuel cell stack is effected by forming a stack structure that allows for the generation of a compressive load through the stack. For example, one technique commonly used is to produce a fuel cell stack with solid, rigid endplates at each end of the fuel cell stack, where each endplate is positioned across the width and breadth and coplanar with the at least one fuel cell and interconnect plate, with a compressive system that exerts a generally uniform compressive force across the width and breadth of the stack and down through the stack layers. Such compressive systems include internal and external bolting arrangements as well as clamping compression systems, all of which serve to compress the stack layers.

Creating such a generally uniform force of sufficient magnitude throughout the fuel cell stack poses significant engineering and design challenges and production tolerance limits on the fuel cell stack components and stack assembly and fuel cell stack operating conditions. Very small variations in, for example, interconnect plate thickness across a stack layer width and breadth, and variations in interconnect plate flatness, variations in compressive load application, material and component thermal expansion variations over the operating range of the fuel cell stack, material compression variations in seals, gasket thickness, and interconnect thickness can produce significant variations in general and/or local stresses seen by components. These stress levels (and the variation in them), if they are too great, can lead to fuel cell stack component failure; or, if they are too low, can mean insufficient contact pressure is generated between an interconnect layer, the current collector and the second electrode, resulting in increased electrical contact resistance and reduced fuel cell stack performance when in operation. Allowance for these variations, and the summation effects of these variations, need to be engineered into the design and manufacture of the stack components (for example in the form of highly precision engineered components to minimise variations) and into the assembly of the stack and the assembly processes used, and also into the operation of the stack as it undergoes thermal expansion and contraction during start-up, shutdown and load cycling during use.

This form of fuel cell stack assembly, although commonly used, suffers from the problem of increased cost and complexity due to the manufacturing constraints imposed by the tight component tolerances required, and the resulting engineering constraints of its construction, and degradation in operational performance of the fuel cell stack and the fuel cell stack components as the variations cause over- or under-stress within the various stack layers as described above.

Examples of prior art fuel cell stack assemblies include those of US 2003/0235743 which (see e.g. numbered paragraph 30) discloses fuel cells separated by electrically conductive interconnects, the anode of a first fuel cell being connected to an interconnect by a first plurality of filaments, the interconnect being connected to the cathode of an adjacent fuel cell by a second plurality of filaments. As is shown in FIG. 1, electrically non-conductive spacers 36, 38 separate sections of the fuel cells, and ceramic electrolytes 14 and cathodes 18 and anodes 16 extend over the spacers 36, 38. Means of sealing the electrolyte and cathode and anode with the spacers is not taught, and if compressive force is to be used to effect sealing then that will be expected to lead to damage to the electrolyte and cathode and a reduced lifespan. Further, with the electrolyte and anode exposed to the exterior of the fuel cell, there is no teaching that hydrogen ion flow through the electrolyte to the exterior of the fuel cell is to be prevented. Further, there is no teaching of how the large number of "filaments" are to be connected to the respective anodes, cathodes, and interconnects, and this would appear to be a complex and inconvenient operation. Notably, the filaments do not extend outside of the perimeter of the anode/cathode, and the filaments are permanently connected to the interconnects. Note that the "current collectors" described by US 2003/0235743 correspond to the "cover plates" and "endplates" described herein, and not the "current collectors" described herein.

EP 1434294/US 2004/0101742 discloses a fuel cell stack assembly with individual fuel cells separated by electrically conductive mesh spacers connected to an electrically conductive interconnect plate. During assembly of the fuel cell stack, the spacers are compressed by contacting the anodes and cathodes of adjacent fuel cells, thus exerting compressive force upon the anodes and cathodes in order to achieve electrical connection.

The general construction of fuel cells is taught in the above art, as well as e.g. Leah, R T, Brandon, N P, Aguiar, P, Journal of Power Sources, 2005, 145(2): 336-352; WO 02/35628; WO 03/07538; GB 2394114; WO 2004/089848; GB 2400723; GB 2405028; and WO 2005/078843. The contents of each of the references discussed herein, including the references cited therein, are herein incorporated by reference in their entirety.

There is therefore a need to provide an improved fuel cell stack assembly with good current collection properties and which address the prior art disadvantages. It is thus an aim of the present invention to overcome the prior art disadvantages. It is a particular aim to provide a design that decouples the contact pressure and sealing requirement of a fuel cell stack from the component tolerances and operational tolerance variations within the fuel cell active areas, and hence moves the compression load requirements to the outside areas of the fuel cell stack so that the load is only required for gasket sealing and so results in a reduced magnitude of the stack compression load required, thus relaxing component production tolerances and end-plate stiffness requirements, and so resulting in a lower-cost stack assembly with improved operating performance.

According to the present invention there is provided a fuel cell comprising:
(i) an electrolyte layer defining first and second faces and with said first face mounted on and in electrochemical contact with a first electrode and with said second face mounted on and in electrochemical contact with a second electrode; and
(ii) an electrically conductive current collector joined to or mounted on or in said second electrode and in electrical contact with said second electrode, said electrically conductive current collector having an at least one extension extending outwards of a perimeter defined by said first and second electrodes and said electrolyte.

Thus, by having the current collector extending beyond the perimeter of the electrodes and electrolyte, it is possible to achieve electrical contact with the fuel cell by making electrical contact with the current collector at least one extension beyond the perimeter and this does not require the exertion of pressure upon the second electrode or the electrolyte. This therefore allows for a reduction in the requirements for tight engineering and manufacturing tolerances for the fuel cell and fuel cell stack components compared to those used with prior art fuel cell designs where the electrical contact was made by contacting the area on or in the fuel cell electrodes.

Preferably, the first electrode is mounted on an electrically conductive substrate. The electrically conductive substrate extends beyond the perimeter defined by the first and second electrodes and the electrolyte. This electrically conductive substrate is preferably connected to an electrically conductive interconnect plate. Thus, the fuel cell preferably additionally comprises an electrically conductive interconnect plate. Thus, using the present invention, electrical contact can be made with a fuel cell without placing any compressive force upon either of the electrodes or upon the electrolyte. In certain embodiments, of the present invention, the fuel cell additionally comprises an electrically conductive interconnect to which an adjacent fuel cell stack layer current collector is bonded.

Preferably, the electrically conductive substrate is a metal plate, or a foil with a porous region bounded by a non-porous region.

Preferably, the electrically conductive substrate defines a gas-porous zone over which is mounted the first electrode, electrolyte and second electrode, the porous zone being surrounded by a non gas-porous zone.

Preferably, the electrolyte extends over the first electrode such that it provides a gas seal over the first electrode.

Preferably, the first and second electrodes and electrolyte are sealingly attached to the electrically conductive substrate.

In preferred embodiments, the electrically conductive substrate defines a plurality of sections, each section having mounted on it the first electrode, electrolyte and second electrode. In such embodiments, the perimeter defined by the first and second electrodes and the electrolyte is preferably the outermost perimeter about the fuel cell sections considered as a whole. More preferably, each section defines a gas-porous zone surrounded by a non gas-porous zone.

Preferably, the fuel cell additionally comprises:
(i). an electrically conductive interconnect;
(ii) an electrically conductive substrate upon which is mounted the first electrode, the electrolyte, the second electrolyte and the electrically conductive current collector and from which extends the at least one current collector extension; and
(iii) an at least one electrically non-conductive structure (for example a spacer or gasket) which in-use provides mechanical support for components placed on top of it.

Such a fuel cell is also referred to as a fuel cell stack layer.

Preferably, the al least one electrically non-conductive structure (iii) comprises an electrically non-conductive spacer located between the electrically conductive substrate and the at least one current collector extension to prevent shorting of the fuel cell and provide mechanical support.

Such a fuel cell defines an electrical flow path from the (i) the electrically conductive interconnect to (ii) the electrically conductive substrate, through the first electrode, electrolyte and second electrode to the current collector and the at least one current collector extension. Electrical flow can then pass to a component placed on top of the fuel cell, e.g. an electrically-conductive endplate or the electrically conductive interconnect of an adjacent fuel cell stack layer.

In the case of a fuel cell stack comprising a number of layers of fuel cells of the present invention, it is possible to achieve electrical contact between adjacent fuel cell stack layers through making good electrical contact between the current collector at least one extension of a first (lower) fuel cell stack layer and the underside (lower face) of the electrically conductive interconnect of the adjacent fuel cell stack layer without the need to exert pressure upon the first or second electrodes or the electrolyte of the first fuel cell stack layer. Thus, the electrical connection from one fuel cell stack layer to an adjacent fuel cell stack layer can be made independent of the need to compress one fuel cell stack layer onto the adjacent fuel cell stack layer. In particular, there may be no need to make electrical contact with a fuel cell of the present invention within an area defined by the perimeter of the first and second electrodes and the electrolyte. In particular, the current collectors of the present invention may not be permanently attached to or depend from an adjacent interconnect.

The uppermost portion of the at least current collector extension in the region beyond the perimeter of the first and second electrodes and electrolyte is preferably vertically higher than the uppermost portion of the current collector in the region within the perimeter of the first and second electrodes and electrolyte.

Electrical contact between the at least one current collector extension and an adjacent electrically conductive interconnect or endplate can be made by a variety of means, including but not limited to classical metal jointing/joining techniques such as welding, spot welding, brazing, friction welding, gluing, using conductive pastes and bolting.

Another electrical contact technique is to sandwich or pin the at least one current collector extension of a first fuel cell stack layer between:
(i) the electrically conductive interconnect of an adjacent second fuel cell stack layer in the area outside of the first fuel cell stack layer fuel cell perimeter defined by the first and second electrodes and the electrolyte; and
(ii) an electrically non-conductive structure positioned on the first fuel cell stack layer in the area outside of the first fuel cell stack layer fuel cell perimeter defined by the first and second electrodes and the electrolyte.

Thus, a fuel cell according to the present invention preferably additionally comprises an electrically non-conductive structure mounted between the electrically conductive substrate and the current collector. More preferably, the electrically non-conductive structure does not contact the first or second electrodes or the electrolyte. More preferably, it is positioned outside of the perimeter defined by the first and second electrodes and the electrolyte, thus between the electrically conductive substrate and the at least one extension.

Thus, the compression required in the fuel cell stack to achieve good electrical contact from one fuel cell stack layer to an adjacent fuel cell stack layer does not require any compressive force to be applied to the anode, electrolyte and cathode structures of the fuel cell stack layers.

The electrically non-conductive structure is in certain embodiments continuous and surrounds the current collector, the first and second electrodes and the electrolyte so as to define a volume containing them. The electrically non-conductive structure can further define at least one orifice to allow fluid communication with the volume, particularly the inlet and outlet of gases supplied to one or other or both of the fuel cell electrodes. In other embodiments, the electrically non-conductive structure is discontinuous and only partially surrounds the first and second electrodes and electrolyte.

Thus, the at least one orifice or discontinuous non-conductive structure can define an at least one manifold. Preferably, such manifolds define at least one fuel inlet, at least one fuel outlet, and at least one oxidant outlet.

The dimensions and material properties of both the electrically non-conductive structure and the current collector are tailored to achieve the desired clamping effect and to allow for thermal expansion effects and ensure at least one effective current collection path between one fuel cell stack layer and the adjacent fuel stack layer during assembly and over the lifetime operation of a fuel cell stack assembly.

Examples of electrically non-conductive structures include electrically non-conductive spacers and electrically non-conductive gaskets. Preferably, the electrically non-conductive structure comprises at least one electrically non-conductive spacer and/or at least one electrically non-conductive gasket. Preferably, it comprises at least one electrically non-conductive spacer positioned between the electrically conductive substrate and the at least one current collector extension, and at least one electrically non-conductive gasket.

Examples of designs suitable for use as electrically non-conductive spacers include a variety of shapes that in general have two predominantly flat parallel surfaces, of which in-use each surface is either against the electrically conductive substrate or the at least one extension area under an adjacent component such as an electrically conductive interconnect or electrically conductive endplate.

Suitable shapes for an electrically non-conductive spacer include strips, blocks, disc, oval and lozenges.

The electrically non-conductive spacer shape designs are preferably flat-topped so that the current flow out of the electrode, through the at least one extension into the adjacent electrically conductive interconnect occurs over a large area and thus reduces localised heating effects as a result of electrical resistance and large current flowing through a small pick-up area.

Preferably, the electrically non-conductive spacer is provided in at least one section, for example 1, 2, 3, 4 or 5 sections. The number of sections is dependent upon requirements of the current collector design: only one per extension, one at each end, every few mm, every few cm, or at or near each corner of the fuel cell. In further embodiments of the present invention detailed below, a fuel cell stack assembly preferably comprises at least one electrically non-conductive spacer section per fuel cell.

The electrically non-conductive structure can be tape cast or screen printed in place or stamped and placed onto the substrate.

The thickness of the electrically non-conductive spacer is determined by a number of factors including the thickness of the final fuel cell components, volume gap above the associated electrode, depth of the features on the underside of the electrically conductive interconnect, designed in-use gas pressure drop across the fuel cell, compressibility of the electrically non-conductive spacer, and compressibility of the at least one extension.

In a preferred embodiment, an electrically conductive substrate is provided having mounted on it an anode, electrolyte and cathode structure that includes the current collector, the structure height being 0.15 mm and the current collector being 0.1 mm thick. An electrically non-conductive spacer is designed to be 0.4-0.55 mm high when the cell is sintered and in the compressed stack state. This allows for, in this case, a 0.35-0.50 mm air gap to exist between the second electrode and the underside of the adjacent electrically conductive interconnect.

Such an electrically non-conductive structure can be screen printed in place. The electrically non-conductive spacer can also be formed by moulding or casting or extruding an electrically non-conductive spacer that can be placed on the substrate.

The electrically non-conductive structure preferably comprises a non-conductive compression gasket. Examples of gasket material include flexible electrically non-conductive gaskets such as the Flexitallic XJ766 vermiculite type gasket. For a non-conductive structure designed to adhere to the electrically conductive substrate (e.g. for screen-printing), the thermal expansion characteristics should be closely matched to that of the electrically conductive substrate. Thus, for an electrically conductive substrate of a CGO (ceria gadolinium oxide) based fuel cell, where the electrically conductive substrate is made of ferritic stainless steel, the electrically non-conductive structure can made predominantly of ceria or CGO. Where the electrically non-conductive structure does not require to be adhered to the substrate, suitable materials for its construction could include CGO or YSZ or a glass frit.

Electrically non-conductive structures can be gas impermeable or gas permeable. Electrically non-conductive structures can be compressible or non-compressible. Electrically non-conductive structures can fully or partially surround the fuel cell perimeter defined by the first and second electrodes and the electrolyte.

The electrically non-conductive spacer material is preferably different to the electrically non-conductive gasket material. As such, there would need to be a tight tolerance on the gap between the electrically non-conductive gasket and the electrically non-conductive spacer where they meet or come close to meeting. This tolerance is preferably controlled so that there is minimal gas bypass through the gap, but at the same time so that there is no interference that could cause stresses to build up in the contact area during assembly or operation. Preferably, one or more of the electrically non-conductive spacer and the gasket is provided with location features such as dimples or nipples in order to control the gap defined between the components and the positioning of the components relative to one another during stack assembly.

In situations where no electrically non-conductive structure is placed between the electrically conductive substrate and the at least one current collector extension, the at least one current collector extension can be joined to the adjacent interconnect in a variety of ways, including but not limited to classical metal jointing/joining techniques such as welding, spot welding, brazing, friction welding, gluing, using conductive pastes, bolting, or clamping arrangements using interference fit components or other tight tolerance component fit designs where the current collector is trapped between the two component interfaces or a component pinch point or slot.

An example of such structures is an open-manifolded cathode stack design where the fuel feed flow and reacted fuel flow are manifolded within the stack using non-conductive compressible gaskets, and the oxidant gas flows openly across the second electrode side and is not manifolded through the stack.

The fuel cell preferably also comprises fuel and oxidant inlet means so as to supply fuel and oxidant to it.

In certain embodiments, the electrically conductive interconnect is provided as a single component part. In other embodiments, it is provided as discrete components, namely an electrically conductive interconnect and an electrically conductive spacer which in-use is positioned between the electrically conductive interconnect and the electrically conductive substrate. In all embodiments, it defines a volume which allows gas flow to the electrically conductive substrate. Preferably, the electrically conductive interconnect is an electrically conductive interconnect plate. Preferably, the electrically conductive spacer is an electrically conductive spacer plate.

In a preferred embodiment where the electrically conductive substrate and the electrically conductive interconnect are both made from ferritic stainless steel, an electrically conductive spacer can also be made from the same or similar ferritic stainless steel.

Preferably, the electrically conductive spacer can be made from the same material as the electrically conductive interconnect, and the joining of the electrically conductive interconnect, the electrically conductive spacer, and the electrically conductive substrate can be carried out in one joining process such as laser welding.

Preferable materials for the electrically conductive interconnect, the electrically conductive spacer, and the electrically conductive substrate can be chosen independently from the group consisting of: metal, ferritic stainless steel, and conductive ceramic. In a method of manufacture of a fuel cell or fuel cell stack assembly as defined hereinbelow, the joining of such components can be effected in a single step for example by laser welding, giving the advantages of the use of a single metal joining process, reduced processing time, reduced manufacturing cost, and reduced risk of gas leakage.

For preferred fuel cells of the present invention, the electrically conductive substrate is typically 0.1-0.3 mm thick, the electrically conductive spacer 0.1-0.3 mm thick, and the electrically conductive interconnect 0.1-0.5 mm thick. More preferably, the electrically conductive substrate, spacer and interconnect plate are each 0.2 mm thick.

Preferably, the upper side of the electrically conductive interconnect and the underside of the electrically conductive substrate define a first volume through which fuel, particularly a hydrocarbon, hydrogen or oxidants such as air or oxygen, can pass. The other of a fuel and oxidant can be passed across the second electrode in a second volume defined by the upper side of the electrically conductive substrate, the electrically non-conductive structure, and the underside of an adjacent electrically conductive interconnect.

In a fuel cell stack assembly (below), this therefore means that discrete volumes are defined through which fuel and oxidant are passed, allowing the fuel cell to operate. Outlet/exhaust means can also be provided, although in certain arrangements they are not necessary. For example, in certain embodiments a single opening can be provided for the flow of air into and for the flow of air and exhaust gases out of a fuel cell. The construction of fuel cells and their component parts so as to allow appropriate passage of fuel and oxidant is widely described elsewhere in the art and will be readily apparent to a person of ordinary skill and is therefore not discussed further herein.

Whilst the present invention allows for current collection to occur without applying compression loading across the electrode surface, there may be occasions when loading does occur. Such situations include when the fuel cell stack is subject to rapid physical movement in a plane non-parallel with the electrode surface, such as when a car goes along a bumpy road. In these situations it is desirable to support the first and second electrodes and the electrolyte (also referred to as the fuel cell "active area").

This can be done by providing protrusions such as dimples in the area of the electrically conductive substrate underneath the fuel cell active area and in the underside of an adjacent electrically conductive interconnect to limit the movement of the intervening components whilst spreading the load. Indeed, it is possible for the electrically conductive interconnect to carry dimples on both sides. A convenient way to create the dimples is by a metal press, whether in a single or double step process. The dimples are not designed for current collection but are designed to accommodate minimal pressure drop and yet not induce undue stresses on occasions when they to come into contact with the fuel cell second electrode surface.

The height of the dimple affects the pressure drop across the fuel cell. The height of the upwardly-extending dimples is equal to or less than that of the gap defined between the electrically conductive interconnect and the electrically conductive substrate.

When the fuel cell comprises an electrically conductive spacer, the height of the upwardly-extending dimples is preferably less than that of the electrically conductive spacer. The height of the downwardly-extending dimples is equal to or less than the distance to the second electrode.

The lateral spacing of the dimples is preferably matched to the expected in-use loading and deflection characteristics. This Can be readily modelled by a person of ordinary skill in the art and the dimples placed accordingly. Thus, the dimple pattern need not be regular.

In preferred fuel cell designs, the upwardly-facing dimples have sharp or rounded tops in order to minimise disruption of fuel flow to the fuel cell. The downwardly-facing dimples facing towards the fuel cell second electrode are preferably provided with flat tops, as they are more likely to contact the fuel cell second electrode, the flat tops reducing localised stress by spreading out the contact load over a larger area than that achieved by a rounded or pointed dimple. The dimples can additionally encourage a non-linear flow of gases on both sides of the interconnect plate, i.e. of both oxidant and fuel, thus enhancing mixing of fuel and reacted fuel gases and of oxidant and reacted oxidant gases.

In practice, the size and layout of the protrusions, e.g. dimples, is dictated by the required pressure drop across the respective sides of the fuel cell, the thickness and material of the electrically conductive interconnect plate, and the expected operating environment of the fuel cell stack assembly.

The at least one current collector extension preferably extends away from the first and second electrodes and the electrolyte in a plane generally parallel with the plane of the first and second electrodes and the electrolyte. Thus, in a fuel cell which has got arranged on a vertical (Z) axis in the order: the first electrode layer, the electrolyte, the second electrode layer and the current collector, the at least one extension extends away from, i.e. extends beyond or protrudes from, the perimeter defined by the first and second electrodes and the electrolyte on the X/Y-axes. Of course, the current collector can also extend on the Z-axis. Reference here to axes is to geometric axes.

Thus, with the current collector extending away from the fuel cell on the X/Y-axes, electrical contacts with the second electrode (e.g. by an adjacent electrically conductive interconnect) are effected via the current collector at least one extension away from the second electrode and thus is done without exerting pressure (i.e. a compressive force) upon the second electrode.

In certain embodiments, the fuel cell is a solid-oxide fuel cell (SOFC). In other embodiments, the fuel cell is a proton-exchange membrane fuel cell (PEMFC), a phosphoric acid fuel cell (PAFC), a direct methanol fuel cell (DMFC), a molten carbon fuel cell (MCFC), or an alkaline fuel cell (AFC) or other such fuel cell types where there is an anode-electrolyte-cathode structure.

The electrically conductive interconnect acts as a support for the other fuel cell components and also acts to separate fuel and oxidant gas streams.

The first electrode can be either the anode or cathode. Preferably, it is the anode.

The first electrode is in electrical contact with the electrically conductive interconnect such that by connecting the electrically conductive interconnect to the second electrode of the fuel cell (or a fuel cell stack assembly) an electrical circuit is formed. Naturally, an electrical load can be placed across the circuit during fuel cell operation. Typically, several fuel cells are connected in electrical series before making the electrical circuit connection as described above with the circuit connecting the uppermost electrode to the lowermost electrode or thereabouts.

The electrolyte is an appropriate fuel cell electrolyte. Exemplary electrolytes include those based on yttrium-doped zirconium oxide (YSZ) electrolytes and gadolinium-doped cerium oxide (CGO) electrolytes. Other fuel cell electrolytes are well known and will be readily apparent to one of ordinary skill in the art.

The second electrode is electrically insulated from the first electrode by the electrolyte.

Preferably, the current collector is metallic, preferably a steel, more preferably a ferritic stainless steel.

The current collector is preferably a flexible, electrically conductive metal structure. Suitable metal structures include meshes, particularly woven or knitted meshes, perforated metal (such as metal foil or sheet), laser drilled or laser machined metal foil or sheet, chemically etched metal components, expanded metal, metal foam, metal wool, at least one metal wire strand, and combinations of same. Other forms of current collector can incorporate a continuously electrically conductive element within a non-electrically conductive porous structure, such as a metal wire strand or strands woven into a flexible sheet of rayon or similar material.

The current collector can be woven, knitted, stamped, chemically etched, formed, punched, laser machined, or water formed into shape.

The current collector at least one extension can be arranged to be flexible. The flexible design of this section allows for easy assembly of a fuel cell layer or fuel cell stack assembly, meaning that the current collector and fuel cell and interconnect can accommodate thermal expansion changes during fuel cell stack start-up, operation and shut down, and can absorb other mechanical loads during operation. Such flexibility can be achieved by a number of methods including but not limited to folding, increased porosity in the bend areas, expansion joints, thinning of the material in the flexible areas, incorporation or use of a different electrically conductive material on the bend area (such as using chemically etched foil for the area in contact with the electrode with wires or a wire welded to the foil and then protruding beyond the electrode area).

Preferably, the area on the underside of the electrically conductive interconnect which contacts the at least one current collector extension is flat or consists of at least one ridge area. The ridge or ridges (for example, at least 1, 2, 3, 4 or 5 ridges) preferably extend downwards.

Under loading and temperature a flat area could bow, thus reducing the contact area and thus increasing the electrical resistance seen at the electrical junction between the at least one current collector extension and the electrically conductive interconnect plate. To overcome this effect, the contact area can be made with a set of raised ridges where the stiffness of the ridge is unaffected by the potential to bow.

In practice, the shape and number of ridges is dictated by the electrically conductive interconnect material plate thickness, compressive load, temperature of operation, area of coverage of the at least one current collector extension, the current being taken off the fuel cell and through the stack, and the compressibility and shape of the electrically non-conductive spacer.

In one embodiment, the electrically non-conductive spacer is 8 mm wide, and the at least one current collector extension generally covers the 8 mm width. The opposing face of the interconnect plate has a series of 3 ridges on it which lie parallel to the line of the electrically non-conductive spacer and which are arranged so that the flat area of the ridges cover sufficient area of the at least one current collector extension, and thus the electrically non-conductive spacer width. In this case, a first ridge of 0.2-2.0 nun height starts in line with the edge of the electrically non-conductive spacer and is 1.8-2.0 mm wide. A space of between 0.5-1.0 mm then exists between it and a second ridge of generally the same shape as the first ridge. There is then a second gap of generally the same shape as the first gap, and a third ridge of generally the same shape as the first ridge.

The ridges can be formed by stamping of the interconnect plate, or by other forming processes during manufacture of the plate—machining or moulding.

In another preferred embodiment, a set of metal extensions of the electrically conductive interconnect plate are simply folded around underneath the interconnect plate and folded such that they line up along the direction of the electrically non-conductive spacer.

In another preferred embodiment, the ridges are designed and formed into the electrically non-conductive spacer. The ridged electrically non-conductive spacer is preferably formed by moulding or casting or extruding a shaped electrically non-conductive spacer that can be placed on the electrically conductive substrate.

The current collector can be cut and pre-formed into shape ready for processing with the fuel cell, and prior to stack assembly, or it can be formed in situ when attached to the fuel cell.

The current collector section that is in contact with the second electrode can be either partially or fully embedded in the second electrode. The at least one current collector extension can extend vertically above the second electrode, although of course it must, as above, still extend away from the second electrode beyond the perimeter of the first and second electrodes and the electrolyte.

Where the current collector is a metal structure, preferable metals include stainless steels, particularly ferritic stainless steels. Where the current collector is a non-metal structure, preferable structures are made from flexible, conductive materials including conducting graphite type structures.

The at least one current collector extension can be of the same material and structure as the current collector, or of different electronically conductive materials, and/or of a different structure. Such examples include a perforated metal sheet for the current collector (such as Crofer 22APU (an Fe-based ferritic stainless steel-22% Cr, with engineered additions of Al, Si, Mn, Ti and La—available from Thyssen-Krupp VDM GmbH, DE)) and a single Crofer 22APU wire mesh tab welded to one side of the current collector, being used as the current collector extension. Alternatives include an etched foil current collector with the at least one current collector extension being etched fingers extending from the same foil structure on one or more sides of the current collector.

The step of placing the current collector on, or partially within, or embedding the current collector in the fuel cell second electrode can give rise to an additional benefit—upon process firing, the second electrode material bonds with the current collector, providing an efficient and effective current collection path resulting in reduced contact resistance between the second electrode and the current collector, thus resulting in an improved cell power output compared to prior art fuel cell assembly types. The current collector is preferably designed to have porous and non-porous regions. The porous regions allow for gases to pass into and out of the electrode to which the current collector is attached. The non-porous regions allow the current to be passed to the at least one current collector extension and provide a surface for the electrode material to bond to. The spacing and size of the porous and non-porous regions can be designed to optimise current collection with regard to the lateral current conductivity of the electrode. A highly conductive (low resistance) lateral conductivity electrode can have larger pores or fewer non-porous region. A lower conductive (higher resistance) lateral conductivity electrode will preferably have a higher density of smaller pores so as to reduce the distance from current collector to electrode material. This pore and non-pore design can extend on 2 or 3 dimensions depending on the electrode type and thickness, and the current collector material and design used—e.g. a current collector consisting of two layers of conductive mesh embedded in an electrode.

The thermal expansion characteristics of the current collector are preferably matched to those of the second electrode such that during heating and cooling of the fuel cell no mechanical load or a minimal mechanical load is placed on the second electrode, or electrolyte or first electrode or the current collector which would result in damage to any of them.

The current collector is preferably provided with a treatment or coating for example to reduce contact resistance with the second electrode or other electrically conductive materials, or to impede the flow of harmful metal species or elements into the fuel cell which might impede its performance over time of operation.

Also provided according to the present invention is a fuel cell stack assembly comprising:
(a) at least one fuel cell according to the present invention, defining at least one fuel cell stack; and
(b) cover means disposed around said at least one stack.

Preferably, the at least one fuel cell stack comprises at least two fuel cells arranged electrically in series with one another.

Examples of cover means include at least one endplate located in or at the ends of the fuel cell stack and which can perform or aid at least one of: load distribution, containment, electrical pick-up, gas manifolding, thermal break, and gas sealing.

As above, the at least one fuel cell preferably comprises the first electrode joined to or mounted on or in an electrically conductive substrate. Thus, this extends to for example low temperature fuel cells in which the electrode is not joined to the electrically conductive substrate but instead is placed in electrical contact with the electrically conductive substrate by way of compressive force exerted upon the electrode and electrically conductive substrate. The electrically conductive substrate preferably extends beyond the perimeter defined by the first and second electrodes and the electrolyte. This electrically conductive substrate is preferably connected to the electrically conductive interconnect plate. Thus, using this invention, electrical contact can be made with a fuel cell without placing any compressive force upon either of the electrodes or upon the electrolyte.

The at least one fuel cell of the fuel cell stack can thus be connected so as to define an electrical circuit. In one embodiment and as discussed above, a fuel cell stack comprising a plurality of fuel cells has each fuel cell arranged in series, the current collector of each fuel cell being in electrical contact with the electrically conductive interconnect plate of the fuel cell placed above it.

The at least one fuel cell can define at least one manifold. In preferred embodiments, an inlet fuel manifold is provided for fuel gas to be provided to the at least one fuel cell in the fuel cell stack, and an exhaust fuel manifold is provided for reacted fuel gas to be exhausted from the fuel cell stack. Preferably, the at least one manifold also provides for oxidant flow through the fuel cell stack to the at least one fuel cell and for the exhausting of reacted oxidant gas from the at least one fuel cell. In a further preferred embodiment, the at least one fuel cell defines an open oxidant inlet such that inlet oxidant is provided from the volume surrounding the fuel cell stack and exhausts through the fuel cell stack via an exhaust oxidant manifold.

In a further preferred embodiment, the fuel cell stack assembly is placed in a gas-tight thermally insulated enclosure into which the oxidant gas can be fed, the oxidant gas then being able to flow from around the fuel cell stack into the open manifolded oxidant inlet area.

The cover means preferably comprise endplates. The cover means are preferably in electrical contact with the first and last fuel cell stack layers respectively. An electrical contact may be made between the cover means so as to define an electrical circuit between them passing via the at least one fuel cell. A load may of course be placed across the circuit.

Alternatively, the cover means can be electrically insulated from the first and/or last fuel cell stack layers respectively. An electrical contact may be made with the first and last fuel cell stack layers so as to define an electrical circuit between them passing via at least one fuel cell. In this instance, the electrical insulation between the cover means and the first and or last fuel cell stack layer preferably also acts as a thermal break.

The fuel cell stack assemblies of the present invention have a number of advantages over prior art fuel cell stack assemblies. In particular, they are able to operate without inducing damaging contact stresses over the surfaces of and into the fuel cell ceramic layers.

The fuel cell stack preferably also comprises compression means adapted to exert compressive force through said cover means upon said at least one fuel cell outside of said perimeter of each said first and second electrodes and each said electrolyte to effect good electrical contact between each at least one current collector extension and each adjacent electrically conductive interconnect.

In prior art fuel cell stack assemblies where there is a need to make good direct electrical contact between an electrode, current collector and adjacent interconnect plate (or equivalent electrically conductive structure), then variations in contact pressure through and across fuel cell stack layers from one end of the stack to the other, resulting from stack compression forces and inconsistencies in component manufacture and processing tolerances, greatly affect stack manufacture and in-use operation performance. Reducing the effects of these variations in contact pressure gradients requires significantly tighter component and processing tolerances, a more complex fuel cell stack build, and more controlled operational parameters (such as heat-up and cool-down rates or allowable rate of change in fuel cell stack temperature). Removing the need to make good direct electrical connection between the second electrode and the current collector and the adjacent electrically conductive interconnect plate allows for a relaxing of the processing and manufacturing tolerances required for fuel cell components and fuel cell stack layers. This is possible in the present invention as the areas defined by the fuel cell electrodes are not required to be able to make good direct electrical contact with the current collector and adjacent interconnect plate and still survive fuel cell stack manufacture and in-use operation cycles; the electrical contact is instead taken outside the perimeter of the first and second electrodes and the electrolyte and made using a reduced contact area to the adjacent interconnect plate. With a greatly reduced contact area there is less stack compression force required to achieve desired electrical and sealing effects. The stack compression force is thus only required to provide sufficient fuel cell stack layer-to-layer electrical connection, via the current collector extensions, and, if required, compression gasket sealing or contact. Thus the reduction in area required for the compression force to act on in order to provide such suitable electrical connections when compared to existing prior art results in a greatly reduced compression force requirement.

Thus the present invention seeks to overcome the prior art disadvantages and provide a design that couple the contact pressure and sealing requirement of a fuel cell stack from the component tolerances and operational tolerance variations within the fuel cell active areas, and hence moving the compression load requirements to the outside areas of the fuel cell stack so that the load is only required for basket sealing, and so resulting in a reduce magnitude of the stack compression load required; thus relaxing component productions tolerances and end-plate stiffness requirements, so resulting in a lower-cost stack assembly with improved operating performance.

The reduced stack compressive force advantage resulting from the present invention allows for the cover means to be appropriately shaped and due to the overall configuration of the fuel cell stack assembly, they exert pressure upon the fuel cell(s) in the desired areas and not upon the electrodes or electrolyte. A solid endplate can be used, as with prior art fuel cell stack assemblies. Alternatively, endplates not having a solid central region corresponding to the area within the perimeter of the first and second electrodes and the electrolyte may be used. These non-solid endplates are therefore lighter (and so have less thermal mass) and so can be, if required, heated and cooled faster than the equivalent solid designs. In addition, as the endplates are not required to support such a large compressive load, they can be constructed from a simpler design and a reduced-specification material.

Preferably, the fuel cell stack assembly additionally comprises clamping means adapted to exert compressive force upon the cover means. The fuel cell stack and clamping means is preferably arranged so that the compressive force is only exerted outside of the perimeter defined by the first and second electrodes and the electrolyte. The clamping and cover means preferably includes non-solid endplates or a clamping frame structure. Examples of clamping means include bolts which exert compressive pressure upon the endplates (i.e. cover means). The bolts can be arranged internally or externally of the fuel cell stack boundary. One advantage of reduced compression forces within the stack is that it enables reduced specification bolting materials and/or reduced diameter bolts to be used and yet still achieve the desired compression operational performance for given temperatures. This advantage leads to reduced cost components for the stack assembly.

As mentioned above, in prior art fuel cell arrangements, it is difficult to obtain uniform contact pressure across the surface of a fuel cell during stack assembly and stack operation because of the variation in component tolerances resulting from component manufacture and processing and also tolerance variation arising from the stack assembly itself and component thermal expansion variations during fuel cell stack operation. Examples of component tolerance variations include variability of fuel cell electrode-electrolyte-electrode flatness and thickness, plate flatness, variability in compressive load application, material compression variability in the fuel cell stack seals, and variations in gasket thickness, interconnect thickness, endplate thickness and flatness, and other stack component flatness. When building a multi-layer stack these tolerances must be tightly controlled. Being outside these often stringent component tolerance requirements during stack construction or stack operation can induce excessive general and localised stress levels within the stack and the fuel cell stack layers, leading to failure of the fuel cell ceramic layers, or for there not to be enough contact pressure between the current collector and the adjacent interconnect plate, leading to increased resistance in the current collection electrical path. During operation of a fuel cell stack, the fuel cell stack components undergo thermal cycles at start-up, during operation and at shutdown. During these phases, the components of the fuel cell stack undergo thermal expansion and contraction at different rates and times as the temperature in the stack varies with time and in the X-, Y- and Z-axes. The effect of fuel cell cracking resulting from excessive stresses may impair fuel cell performance or generate localised heating or even catastrophic failure resulting from the mixing of the fuel and oxidant streams. By significantly reducing, or even mitigating, the demands placed upon the tolerance requirements for component parts and their manufacturing methods, fuel cell stacks can be assembled using simpler build processes with components made using simpler and more cost effective manufacturing processes, resulting in the quality assurance pass rate of fuel cell stack builds increasing, and in-use fuel cell stack operational failure mechanisms being reduced.

Furthermore, in the prior art designs, the current collector to fuel cell electrode contact pressure requirement raises challenges in the design of stack endplates. Application of generally uniform load over the central fuel cell area of the electrode throughout the stack necessitates stiff endplates adding mass and complexity. The present invention, by moving the load requirement to the periphery of the stack and reducing its magnitude, enables the endplate stiffness, and therefore mass, to be significantly reduced, allowing the use of a lighter, simpler and reduced-cost component. Reducing the mass of the endplate means that the thermal capacity of the fuel cell stack can also be reduced, meaning that the stack can be warmed from cold to its optimal operating temperature more quickly than fuel cell stacks incorporating conventional endplates, thus enhancing stack responsiveness and usefulness. The reduction in load magnitude also reduces the compressive force required, thus reducing the size and design challenges of the fuel cell stack compression system, its complexity and cost. For instance, reducing the compressive load requirements results in the ability to use reduced diameter compression bolts that can, depending on the temperature of operation, also be made from less high-grade specification materials.

When arranged in a fuel cell stack, the fuel cells are preferably arranged so that they are electrically connected either in series or in parallel. Most commonly, the fuel cells in a stack are connected in series where the negative electrode side of one fuel cell is attached to the positive electrode side of the adjacent fuel cell via some conductive means.

Making use of the at least one current collector extension allows for the convenient and simple arrangement of fuel cells in parallel in an electrical circuit. Where the fuel cells are connected in parallel, a plurality of the positive electrodes are connected to one current conductor and a plurality of the negative electrodes are connected to another current conductor. Typically, all of the positive electrodes are connected to one current conductor and all of the negative electrodes are connected to another current conductor. However, it may be desirable to have fuel cell stacks comprising a plurality of fuel cells arranged with a mixture of parallel and series electrical connections and this can be readily achieved with the present invention.

Thus also provided according to the present invention is a fuel cell stack assembly comprising:
(a) at least two fuel cells according to the present invention defining at least one fuel cell stack; and
(b) cover means disposed around said at least one stack, said at least two fuel cells being arranged electrically parallel to one another.

Preferably, the fuel cell stack assembly additionally comprises at least one additional fuel cell arranged electrically in series with at least one of the at least two fuel cells.

The fuel cell stack assembly may additionally comprise first and second current conductors, each fuel cell defining a positive electrode and a negative electrode, the positive electrodes being connected in parallel to the first current conductor and the negative electrodes being connected in parallel to the second current conductor.

In fuel cell stack assemblies having more than two fuel cells, a combination of series and parallel arrangements may be employed.

The parallel electrical arrangement of fuel cells is conveniently achieved with the fuel cells of the present invention by electrically insulating the current collector of a first cell from the electrically conductive interconnect of an adjacent cell. For example, a double non-conducting gasket arrangement may be employed with the at least one current collector extension of a first fuel cell passing between first and second electrically non-conductive gasket sections, the first non-conducting gasket section contacting the upper surface of the electrically conductive substrate, and the second non-conducting gasket section contacting the lower surface of the electrically conductive interconnect of an adjacent fuel cell. Thus, the current collector is electrically insulated from the adjacent electrically conductive interconnect plate between the non-conductive gasket sections. An electrical contact can then be made from the at least one current collector extension to a current conductor exterior of the non-conductive gasket sections, and a plurality of fuel cells can similarly be arranged in parallel in electrical contact with the current conductor. Similarly, the interconnect plates can be arranged in parallel electrical contact with another current conductor, and an electrical circuit can be made by making a further electrical connection between the current conductors.

In more detail, for a parallel connection the at least one current collector extension is taken away from the electrode surface and is not connected to the adjacent fuel cell stack layer interconnect. Instead it can either pass between two non-conductive spacer layers where one non-conductive spacer layer occupies the space between the at least one current collector extension and the substrate and the other non-conductive spacer layer occupies the space between the at least one current collector extension and the adjacent fuel cell stack layer interconnect. This arrangement thus electrically isolates one fuel cell stack layer from the adjacent stack layers. Each at least one current collector extension, which is connected to the second electrode, can then be connected to a common current conductor such as a bus-bar. Likewise the first electrodes are electrically connected to the conductive interconnect plate, and thus the alternative current conductor is formed by connecting all the interconnect plates together onto a common conductor such as another bus-bar.

With these two arrangements, it is possible to arrange for a mix of parallel and series connections within one or more stacks of fuel cells.

Another method of achieving electrical isolation of one fuel cell stack layer from another fuel cell stack layer is to pass the at least one current collector extension through a non-conductive structure. One example of this is the attachment of one or more conductive element (such as a conductive wire) to the at least one current collector extension and then feeding the wire or wires through one or more hole in the non-conductive layer. These wires can then be attached to the common current conductor.

Thus in a fuel cell stack of the present invention it is not a requirement to provide a compressive force to the anodes or cathodes or the electrolyte to achieve current collection and electrical contact from one fuel cell stack layer and adjacent fuel cell stack layers. Furthermore, the nature of the individual fuel cells and their arrangement to form the fuel cell stack means that the fuel cell stack can be conveniently assembled from pre-fabricated sections, including individual fuel cells. This can be done using component parts with relaxed manufacturing tolerances compared to conventional fuel cell stack designs, particularly since the present invention avoids the need for the exertion of a uniform compressive force over the whole of the fuel cell electrode surface. The fuel cell stack assemblies of the present invention also typically require overall less compressive force to be applied to them to achieve the necessary electrical conductivity than do equivalent prior art fuel cell stacks because the compressive force is only required to provide a sufficient gas sealing gasket compression force in the areas of the gaskets and it is not also required to provide a good contact resistance load across the fuel cell electrode area.

In the fuel cells and fuel cell stacks of the present invention, the second electrode can of course be provided with multiple layers or formed from multiple component parts. For example, it may comprise an active electrode layer (an ion transfer layer) and a functional electrode layer (an exposed electrode layer). For example, an active electrode layer can be provided with a further conductive coating with generally the same or similar or different composition and/or microstructure. The current collector may be placed on or partially in or within any of the second electrode layers as described.

Moving the requirement to provide current collector compression away from the second electrode area frees up the space directly above the second electrode area underneath the adjacent interconnect plate. This affords several benefits. Firstly, it allows greater engineering scope for reducing the gas flow pressure drop across the fuel cell, thus improving overall system efficiency by reducing the system parasitic losses associated with flowing gases through the fuel cell stack. By reducing the compression load on the second electrode, and thus on the electrolyte and the anode, it means that the fuel cell structures do not need to be so mechanically strong, and thus thinner, simpler and reduced cost components can be used in its construction.

Also provided according to the present invention is a method of manufacture of a fuel cell, comprising the steps of:
(i) providing an electrolyte layer defining first and second faces and with said first face mounted on and in electrochemical contact with a first electrode and with said second face mounted on and in electrochemical contact with a second electrode; and
(ii) joining to or mounting on or in said second electrode an electrically conductive current collector such that it is in electrical contact with said second electrode, said electrically conductive current collector extending outwards of a perimeter defined by said first and second electrodes and said electrolyte.

Also provided according to the present invention is a method of manufacture of a fuel cell stack assembly, comprising the steps of:
(a) providing at least one fuel cell according to the present invention defining at least one fuel cell stack; and
(b) disposing around said at least one stack cover means.

Preferably, at least two fuel cells are provided arranged electrically in series with one another.

Also provided according to the present invention is a method of manufacture of a fuel cell stack assembly, comprising the steps of:
(a) providing at least two fuel cells according to the present invention defining at least one fuel cell stack;
(b) disposing around said at least one stack cover means; and
(c) arranging said at least two fuel cells electrically parallel to one another.

Preferably, at least one additional fuel cell is provided arranged electrically in series with at least one of the at least two fuel cells.

The method preferably also comprises the step of clamping the at least one stack and cover means with clamping means.

The various aspects of the present invention with regard to the fuel cells and fuel cell stack assemblies are equally applicable to the methods of manufacture of fuel cells and fuel cell stacks.

In embodiments of fuel cells such as either an anode or a cathode supported fuel cell which do not have a conductive substrate, the fuel cell layer electrodes can be placed in contact with a conductive interconnect. In these cases, contact between one fuel cell stack layer and an adjacent fuel cell stack layer can be made by placing a non-conductive structure between the current collector of one fuel cell stack layer and its interconnect layer. Effective electrical contact from one fuel cell stack layer to an adjacent fuel cell stack layer is then made when the stack is compressed.

As described above, the fuel cells can be arranged in a fuel cell stack to be electrically connected either in series and/or in parallel.

Typically, prolonged operation of a high temperature fuel cell, such as a solid oxide fuel cell, at elevated temperatures (750-1000° C.), and process sintering temperatures (1200-1400° C.), would prohibit the intimate contact which is achieved by the present invention between an electrode particularly the cathode) and a metal such as stainless steel. At such temperatures, oxidation of the steel surface occurs and migration of volatile metal species, particularly chromium which is readily found in e.g. stainless steels such as ferritic stainless steel, into typical cathode and/or electrolyte and/or anode materials is known to lead to loss of performance of the fuel cell. To overcome these problems, the metals used would have to be exotic in nature (and thus expensive) and/or coated with specific materials to slow down or prevent oxide growth and or metal species migration and the resulting electrode and/or electrolyte degradation. This requirement to coat the metals in contact with the fuel cell layers would, of course, lead to increased manufacturing costs for the fuel cells and fuel cell stacks due to increased materials processing costs.

However, in the case of the present invention being applied to the metal supported SOFC described in U.S. Pat. No. 6,794,075, the use of lower grade metals is enabled by the unusually low fuel cell sintering temperatures (<1000° C.) and a reduced fuel cell operating temperature (500-600° C.) employed. At these lower operating temperatures and the relatively short time spent at the sintering temperatures <1000° C., the metal oxide growth and metal species migration is minimal.

Preferably, the second electrode layer is in the form of a wet electrode layer, said step of mounting on or in said second electrode an electrically conductive current collector comprising the steps of:
(A) contacting said wet second electrode layer with said electrically conductive current collector, said electrically conductive current collector being dimensioned such that in an extended form it extends outwards of a perimeter defined by said first and second electrodes and said electrolyte; and
(B) firing said fuel cell in a sintering process so as to bond said current collector to said second electrode.

The method preferably comprises the additional step of providing an electrically conductive interconnect.

The method preferably comprises the additional step of placing an electrically non-conductive structure between said electrically conductive substrate and said at least one current collector extension, and an electrically non-conductive structure between said current collector and said adjacent interconnect.

The electrically non-conductive structure placed between the electrically conductive substrate and the at least one current collector extension is preferably dimensioned such that it is positioned outwards of said perimeter defined by said first and second electrodes and said electrolyte.

Thus in a method of the present invention a first electrode (preferably an anode) and a covering electrolyte can be provided carried by (e.g. joined to) an electrically conductive metallic substrate with a porous region surrounded by a non-porous region with the electrolyte covering the first electrode which in turn covers the porous region. A second counter electrode (preferably a cathode) is deposited over the electrolyte. This can be achieved by electrophoretic deposition (EPD), screen-printing, spraying or similar. This results in the formation of a "wet" electrode ceramic layer. The current collector in the form of a metal structure is then introduced onto or partially into or fully into the wet electrode ceramic layer. This is preferably achieved by lightly pressing the current collector onto the wet electrode ceramic layer or pulling the current collector into the wet electrode ceramic layer by magnetic or gravitational attraction when the current collector material is ferrous. Alternatively, the wet electrode ceramic layer surface tension is utilised so as to effect embedding of the metal current collector structure. Optionally, additional coatings can be applied on top of the current collector in order to provide a porous layer which in-use encourages gas exchange and which further embed the structure. Preferably, such additional coatings comprise the electrode material or similar electrode materials. The arrangement is then fired at a suitable temperature, preferably <1000° C.

In an alternative embodiment of the method of the present invention, a current collector in the form of a metal structure is placed on a prepared electrolyte surface with the electrode material subsequently being deposited on top, such as by screen printing or spraying. The arrangement is then fired as above.

In an alternative embodiment of the method of the present invention, a current collector in the form of a metal structure is placed as detailed above, followed by further processing of the electrode, electrolyte and counter-electrode.

As detailed above, the electrically conductive current collector is typically metallic and is preferably made of the following types: mesh (e.g. woven or knitted), perforated metal (produced by piercing or chemical etching), expanded metal, metal foam, metal wool, one or more individual strands of wire, or a combination thereof. Additionally, the current collector can be of a form where there is a continuously conductive element within a non-conductive structure.

Furthermore, the electrically conductive current collector is preferably stamped or punched or etched, laser cut or laser drilled and/or formed to its final shape. Alternatively, it can be provided in a mechanically formed or non-formed finished structure.

The forming of the at least one current collector extension to cover the non-conductive structure around the fuel cell layers can occur prior to placement of the current collector onto the wet electrode ceramic layer, or after sintering, or they can be formed into their final position using the non-conductive structure layer as a form tool and the whole structure sintered to achieve cathode performance without damaging the other fuel cell components.

The non-conductive spacer can be positioned prior to embedding the current collector in place. For pre-formed non-conductive spacers they can be simply placed using location features to align with the required areas of the fuel cell structure. For wet application, the non-conductive spacer can be screen printed into place.

In all embodiments of the present invention, the current collector is provided with sufficient openings or porosity to ensure adequate gas diffusion to the relevant electrode and avoid mass transport limitation. The porous regions allow gases to pass into and out of the electrode to which the current collector is attached. The non-porous regions allow the current to be passed to the current collector extensions and provide a surface for the electrode material to bond to. The spacing and size of the porous and non-porous regions can be so designed to optimise current collection with regard to the lateral current conductivity of the electrode. A highly conductive (low resistance) lateral conductivity electrode can have larger pores or less non-porous region. A lower conductive (higher resistance) lateral conductivity electrode will have a higher density of smaller pores so as to reduce the distance from current collector to electrode material.

This pore and non-pore design can extend on 2 or 3 dimensions depending on the electrode type and thickness, and the current collector material and design used—e.g. a current collector consisting of two layers of conductive mesh embedded in an electrode.

Pre-treatments or coatings can also applied as appropriate to the current collector to further reduce contact resistance and/or impede the flow of harmful elements from the current collector into the second fuel cell electrode. More specifically, part or all of the electrode material is preferably deposited onto the current collector prior to joining with the remainder of the fuel cell layers and the subsequent firing step.

The use of the current collector as described by the present invention, and the resulting benefit of no requirement for direct pressure to be exerted over the area of the second electrode area, gives rise to the possibility of a void existing between the surface of the second electrode area and the adjacent interconnect plate. This gap could lead to channelling of gases supplied into the area from one or more supply points, to one or more exhaust points as the gas flows along the paths of least resistance.

In the various embodiments of the present invention, the fuel cells and fuel cell stack assemblies can also be constructed so as to optimise gas flow across the second electrode in order to reduce or minimise uniform channelling of the gas flow across the second electrode. Uniform channelling could result in the operation and hence efficiency of the fuel cell(s) being compromised by reduced fuel cell electrochemical activity in areas (so called "dead" or "low flow" areas) that do not receive sufficient gas flow.

To overcome the possible channelling of the gases so described, the fuel cells and fuel cell assemblies can be provided with a diffuser structure above or adjacent the second electrode. Thus, the fuel cells of the present invention can additionally comprise a diffuser located above or adjacent the second electrode. The diffuser is or diffusers are structured and positioned such that it causes gas flow over the second electrode in a generally uniform way over the majority of the surface of the second electrode.

In certain embodiments, the diffuser comprises a mesh-like structure located over the surface of the second electrode. In use, the mesh-like structure being such that it at least partially fills the void (i.e. the volume) defined between the second electrode and the adjacent interconnect or end-plate and does not exert a compressive force upon the second electrode or does not exert a substantial compressive force upon the second electrode. By "substantial compressive force" is meant an amount of force which could result in damage to or degradation of the second electrode or fuel cell.

Thus the mesh-like structure can be attached to an interconnect plate, can be unattached, or be attached to or part of the current collector.

In other embodiments, the diffuser comprises a plurality of layers of mesh, a woven material, or a foam structure.

In other embodiments, the diffuser is an extension of the current collector structure.

In all embodiments, the diffuser is capable of withstanding the operational conditions of the fuel cell without any adverse oxidation effect or mechanical failure effects resulting from thermal cycling experienced during fuel cell operation.

In certain embodiments, the diffuser is in the form of a feature which is not necessarily in contact with the second electrode or the current collector, for example in the form of a feature of the interconnect plate and/or the end plate. Thus the shape and structure of the interconnect itself can promote the flow of gas away from the most direct route to the exhaust area, generating so-called "non-uniform channelling", and thus reducing the opportunity for any dead or low-flow gas areas to exist over the second electrode and so improve fuel cell operation and performance. In certain embodiments, this formed structure is a step restriction (also referred to as a "baffle" or "weir"), and in other embodiments is in the form of an extended region having a V-shaped cross-section or multiple formed regions. Other geometric permutations as necessary to effect a generally or more uniform flow taking at different flow rates, gas compositions, and operating temperatures will be readily apparent to a person of ordinary skill, and can be conveniently be achieved using an iterative design process utilising analysis tools such as three dimensional computational flow dynamics models. It is possible to incorporate more than one restrictor in a fuel cell, each restrictor having the same or a different shape, depending upon the requirements of the particular fuel cell arrangement.

The step restriction can be formed in a fuel cell having a gas inlet at a first end of the second electrode and a gas outlet at the other end of the second electrode, a length being defined between the gas inlet and gas outlet, and a width being defined generally perpendicular to the length, the step restriction being in the form of a partial blockage arranged adjacent to the gas inlet across the width of the fuel cell, and causing generally uniform gas flow. Adjacent to the gas outlet end of the fuel cell, another step restriction can be provided in the form of a partial blockage arranged across the width of the fuel cell. The step restriction can be in the form of a reduction in the vertical height between the upper surface of the second electrode and any electrically conductive substrate and the underside of the adjacent component such as an electrically conductive interconnect.

Step restrictions can be particularly advantageous insofar as they can achieve the required generally uniform gas flow whilst causing a relatively small overall drop in gas pressure across the electrode.

Also provided according to the present invention is a method of manufacture of a fuel cell according to the present invention. Also provided is a method of manufacture of a fuel cell stack assembly of the present invention.

Also provided is a method of operation of a fuel cell according to the present invention. Also provided is a method of operation of a fuel cell stack assembly of the present invention. Preferably, such a method comprises the steps of providing an electrical circuit from a first in-use electrical terminus of said fuel cell to a second in-use oppositely electrically charged terminus of said fuel cell, placing an electrical load upon said circuit, providing a fuel and oxidant feed to an inlet side of said fuel cell under conditions suitable for operation of said fuel cell, and operating said fuel cell such that fuel and oxidant flow across said fuel cell, said fuel being oxidised by said oxidant and an electrical current being generated across said fuel cell, the electrical circuit being from said first terminus to an electrically conductive interconnect to an electrically conductive substrate upon which is mounted said first electrode, said electrolyte, said second electrode, said current collector and said at least one current collector extension, the circuit being from said electrically conductive substrate to said first electrode, said electrolyte, said second electrode, said current collector to said at least one current collector extension to said second terminus and then via said wire and said load to said first terminus.

The present invention is equally applicable to electrode and electrolyte supported solid oxide fuel cells, as well as other fuel cells such as polymer electrolyte membrane fuel cells, direct methanol fuel cells, phosphoric acid fuel cells, alkaline fuel cells, molten carbonate fuel cells, as well as oxygen generators and electrolysers of the same construction.

Thus also provided according to the present invention is an oxygen generator comprising at least one fuel cell according to the present invention.

Thus also provided according to the present invention is an electrolyser comprising at least one fuel cell structure according to the present invention.

The present invention will be further apparent from the following example with reference to the accompanying drawings, in which.

Figure 18:
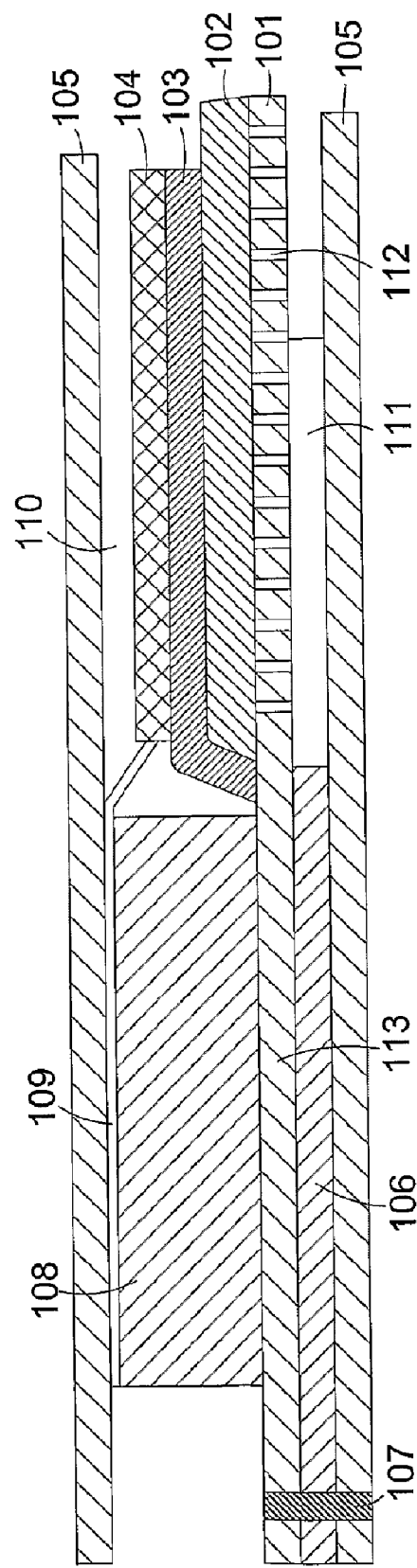
Figure 19:
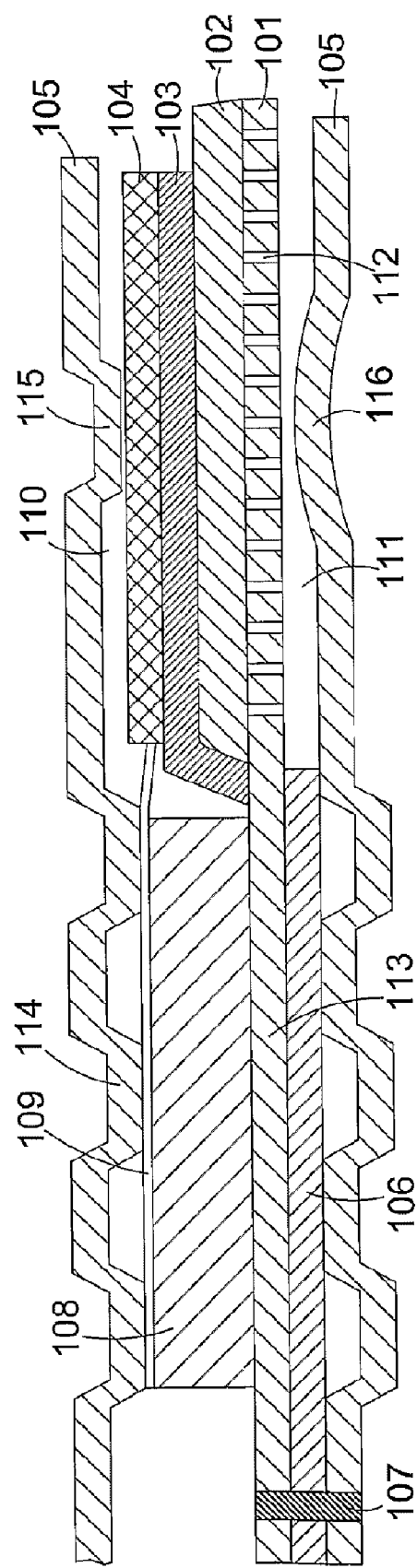
Figure 20:
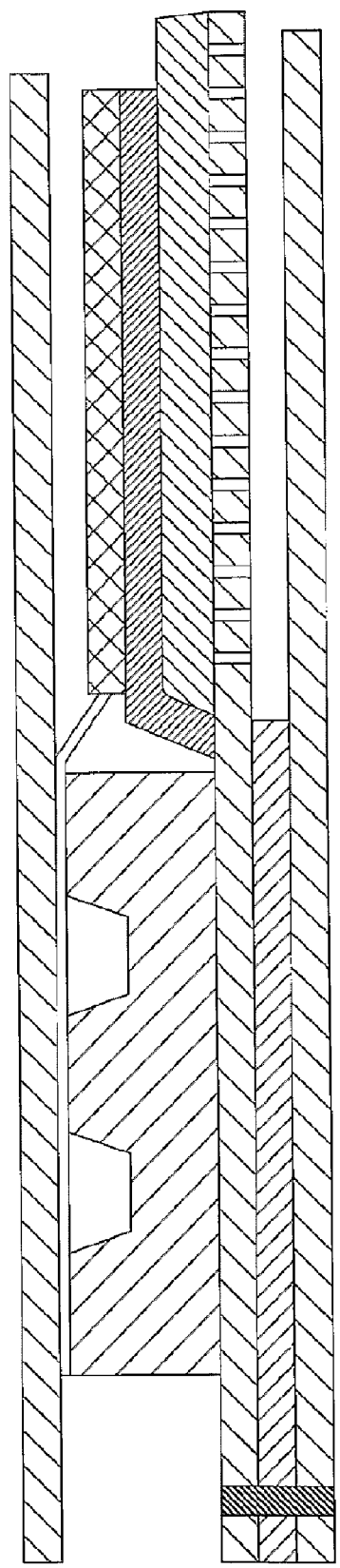
Figure 21:
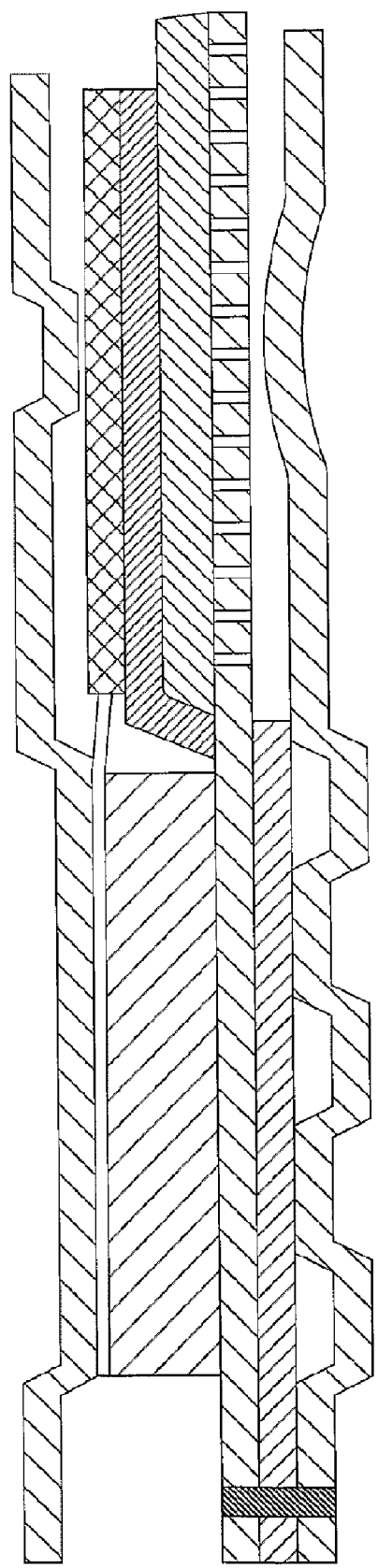
Figure 22:
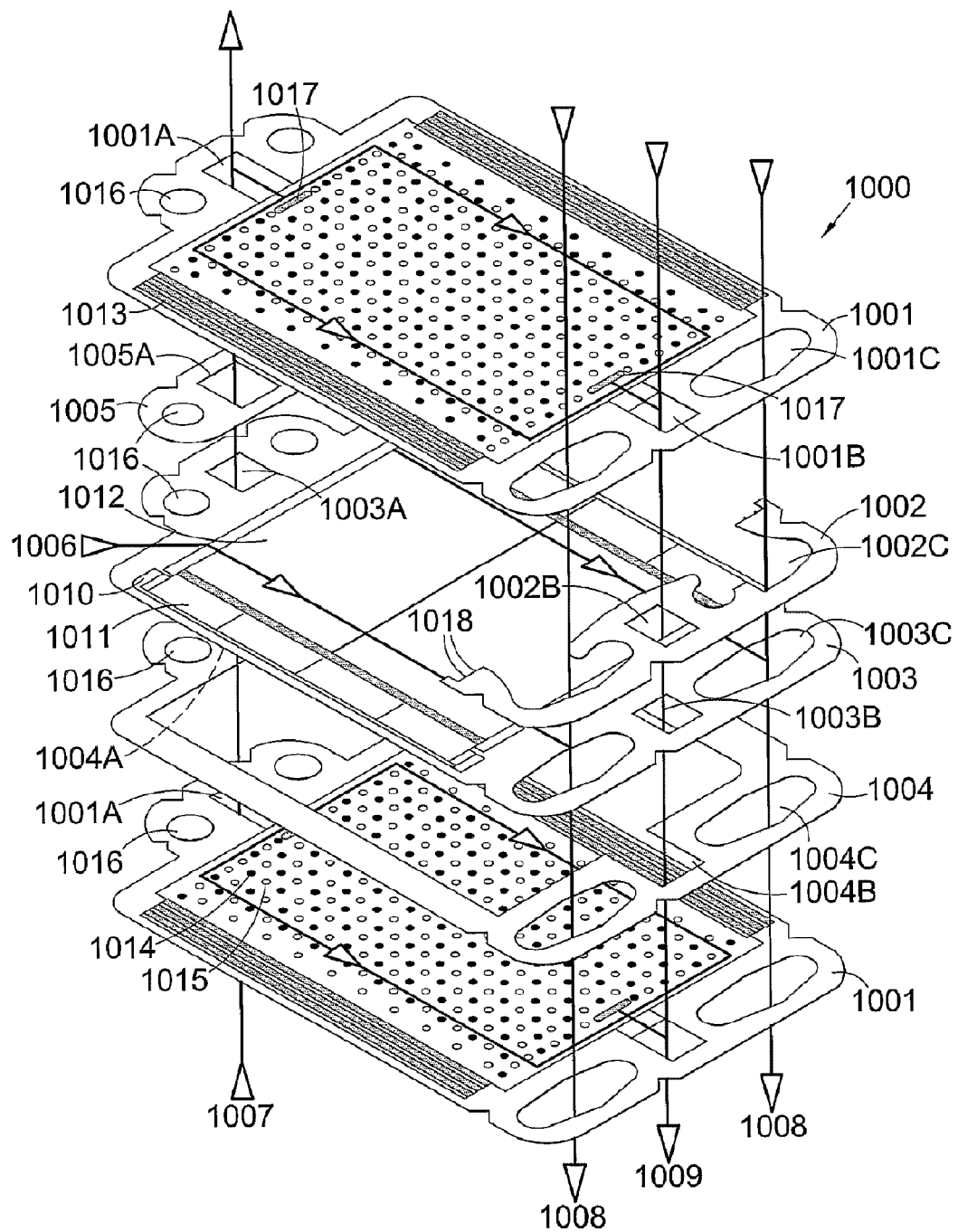

FIG. 18 shows a section of a side view of a fuel cell stack layer with an adjacent electrically conductive interconnect plate where an anode-electrolyte-cathode structure is mounted on an electrically conductive metal substrate which in turn is mounted on an electrically conductive metal interconnect plate with an electrically conductive spacer layer in-between the electrically conductive substrate and the electrically conductive interconnect plate, and the at least one current collector extension pinned between the electrically non-conductive spacer and a flat area on the underside of an adjacent electrically conductive interconnect plate;

FIG. 19 shows a section of a side view of a fuel cell stack layer with an adjacent electrically conductive interconnect plate where the anode-electrolyte-cathode structure is mounted on an electrically conductive metal substrate which in turn is mounted on an electrically conductive metal interconnect plate with an electrically conductive spacer layer in-between them, the at least one current collector extension being pinned between the electrically non-conductive spacer and a ridged area on the underside of an adjacent electrically conductive interconnect plate which has a plurality of dimples on both the lower (electrode) and the upper (substrate) sides;

FIG. 20 shows a section of a side view of a fuel cell stack layer as in FIG. 19 but where the ridges are part of the electrically non-conductive spacer rather than on the electrically conductive interconnect;

FIG. 21 shows a section of a side view of a fuel cell stack layer as in FIG. 19 but where there are different pinning shapes employed for the electrically conductive interconnect to current collector extension areas; and FIG. 22 shows a perspective view of a partially exploded section of a preferred fuel cell stack assembly of the present invention.

In the Figures, the solid arrows show airflow domains, and the dashed arrows show fuel flow domains.

In a first embodiment, anode 1a and a covering electrolyte 1e are provided carried by a metal substrate 4. A cathode 1e is deposited over the electrolyte by screen printing to form a "wet" layer and then the current collector in the form of a woven metal mesh 2 is introduced into the wet layer 1c. The current collector can be pre-prepared in that it can be cut to size and the protruding sides of the current collectors being folded towards the vertical position. The introduction of the current collector into the cathode is achieved by lightly pressing the structure into the wet layer 1c. The arrangement is then fired at a temperature <1000° C.

The pre-formed woven mesh 2 is bonded by the above process and its sintering to the cathode 1c of the fuel cell. To complete assembly of the cell, the extensions (the protruding sections) of current collector 2 which extend beyond the perimeter of the anode, electrolyte and cathode 1a, 1e, and 1c (the current collector extensions) are held into a vertical position and an electrically non-conducting gasket 5 is then placed on top of metal substrate 4. The current collector 2 extensions are then folded back over gasket 5 and the adjacent fuel cell stack layer including the electrically conductive interconnect plate 3 is then placed on top with the protruding current collector 2 extensions being trapped between the gasket 5 and the adjacent interconnect plate 3 such that the adjacent interconnect plate and current collector 2 extensions are in electrical contact. As can be seen from FIG. 1, this electrical contact is achieved without pressure being placed upon anode 1a, electrolyte 1e or cathode 1c.

The above assembly process is shown step-wise in FIGS. 5-8.

Figure 4:
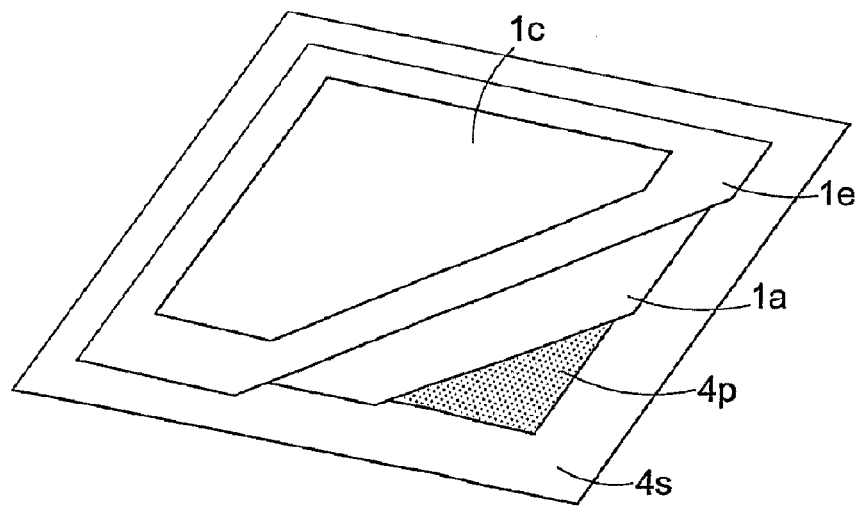
FIG. 4 shows a partial cut-away view of a fuel cell on an electrically conductive substrate.
Figure 5:
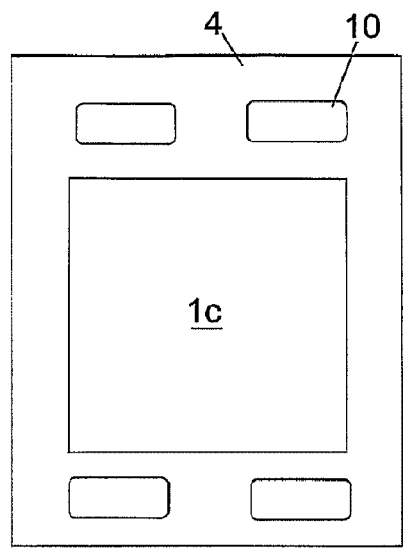
FIG. 5 shows an initial fuel cell manufacturing step with an electrically conductive substrate (base) with a fuel cell deposited upon it, the electrically conductive substrate having stack features outside of the perimeter of the first and second electrodes and electrolyte.
Figure 6:
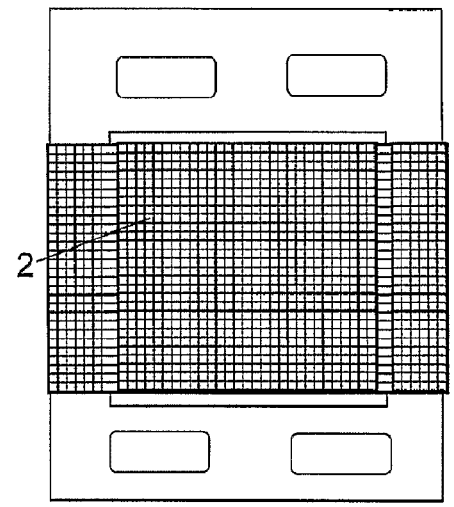
FIG. 6 shows the electrically conductive substrate and fuel cell of FIG. 5 in a subsequent manufacturing step with a current collector mesh embedded in the top (wet) fuel cell layer which is fired.
Figure 7:
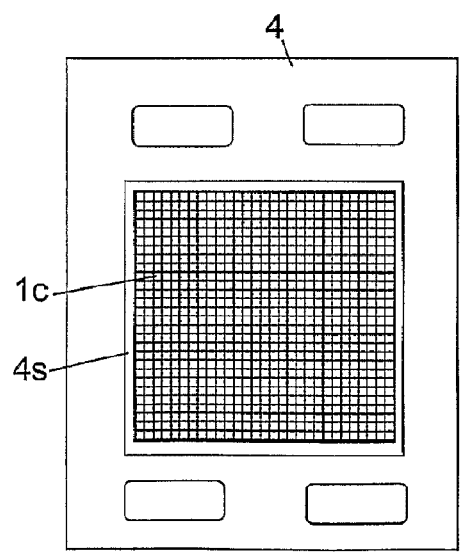
FIG. 7 shows the fired fuel cell of FIG. 6 with the current collector extensions folded vertical to allow placement of a gasket.
Figure 8:
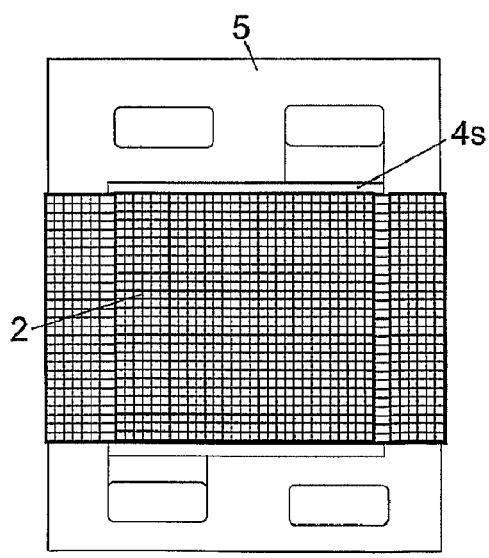
FIG. 8 shows the fired fuel cell of FIG. 7 with an electrically non-conductive gasket inserted on top of the electrically conductive substrate and the current collector extensions folded back down over the electrically non-conductive gasket.

The fuel cell is structured as shown in FIG. 4. Specifically, an anode 1a and covering electrolyte 1e are provided carried on metal substrate 4 which is comprised of a porous region 4p bounded by a solid (non-porous) region 4s. A cathode is then deposited over electrolyte 1e by screen-printing to give a so-called "wet" layer. Current collector 2 is then embedded in the wet cathode layer 1c by light pressing of current collector 2 into the wet cathode layer 1c. The arrangement is then fired at a temperature <1000° C.

In a second embodiment (FIG. 2), cathode 1c is provided in the form of two layers. Layer 1c is an active electrode layer which effects ion transfer, whilst layer 1f is a functional electrode layer providing a high lateral conductivity which is an electrically conductive cermet and is in electrical contact with the active electrode layer which promotes homogeneous current distribution within the layer and a lower resistance connection to the current collector.

Figure 3:
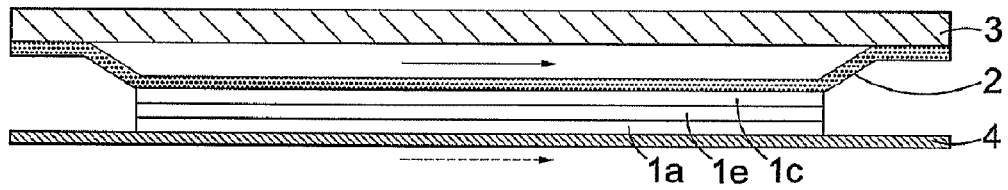
FIG. 3 shows a fuel cell with a metal current collector embedded in an active electrode layer and with current collector extensions joined to an electrically conductive interconnect plate.

In a third embodiment (FIG. 3), an alternative construction is shown where current collector 2 is directly bonded to interconnect layer 4 of the adjacent fuel cell stack layer, thus eliminating the need for gasket 5 to achieve a current collection path whilst still providing a low resistance electrical connection.

Figure 1:
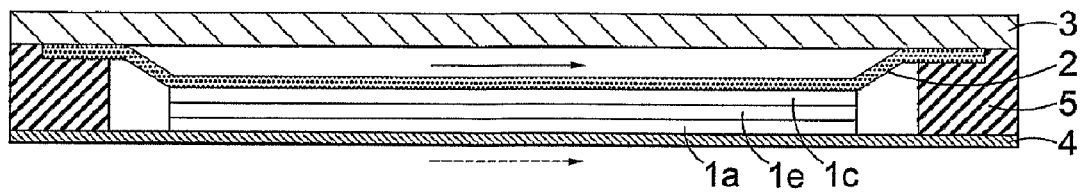
FIG. 1 shows a fuel cell with a metal current collector embedded in a second electrode layer and with current collector extensions clamped between an electrically non-conductive insulating gasket and an electrically conductive interconnect plate.
Figure 2:
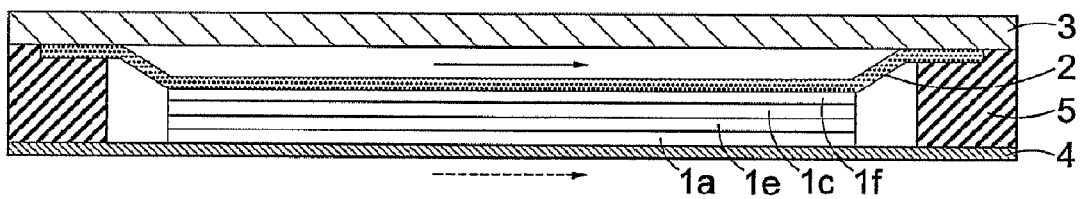
FIG. 2 shows a fuel cell with a metal current collector embedded in a current collection cell layer and current collector extensions compressed/clamped between an electrically non-conductive insulating gasket and an electrically conductive interconnect plate.
Figure 9:
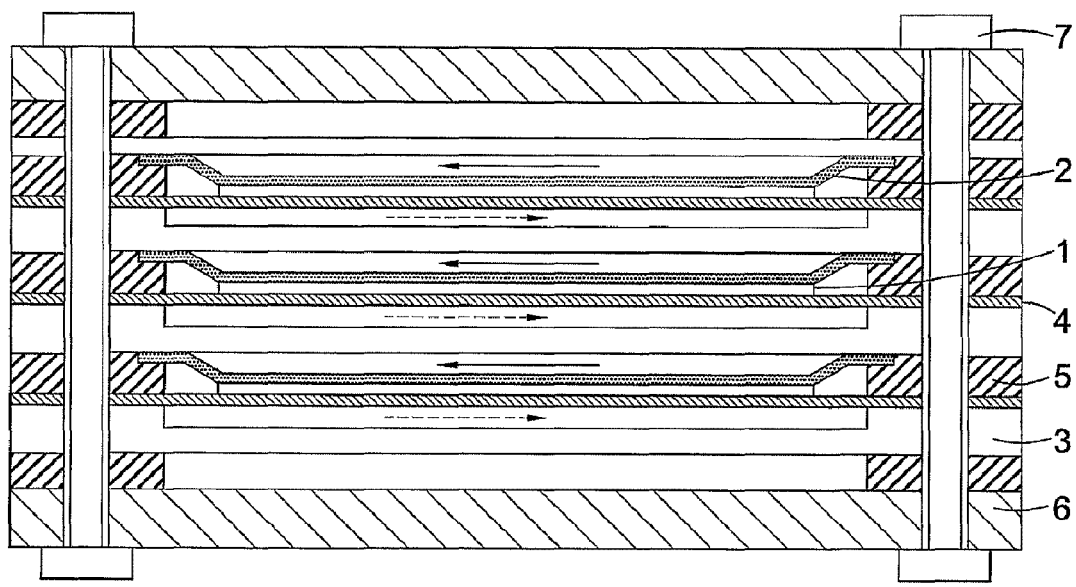
FIG. 9 shows a cross-section through a fuel cell stack assembly.

In order to form a fuel cell stack (FIG. 9), a plurality of fuel cells of FIG. 1 or 2 are assembled into a stack, each stack assembly layer being formed by a fuel cell being placed directly on top of the fuel cell of a previous stack assembly layer. The whole stack arrangement is then clamped between endplates 6, and compressive force exerted upon endplates 6 and thus upon gaskets 5, bases 4, current collectors 2 extensions and interconnects 3 by a compression system comprising tie bolts 7.

In further embodiments (not shown), current collector 2 is configured to ease forming of the current collector extensions by reducing the stiffness of the current collector 2 along the bend lines (e.g. by omission of wire strands or increased porosity in the bend area or added bend lines, or etched bend lines). In other embodiments, a solid metal strip is joined (by spot welding or other common joining means) to the current collector extensions, thus increasing contact area and further reducing electrical resistance within the stack.

To facilitate stack assembly, metal substrate 4 and gasket 5 are formed with bolt holes. To complete stack assembly, endplates 7 are placed over the top and bottom fuel cells of the stack, and bolts 7 are then used to exert compressive force upon the assembly.

Figure 10:
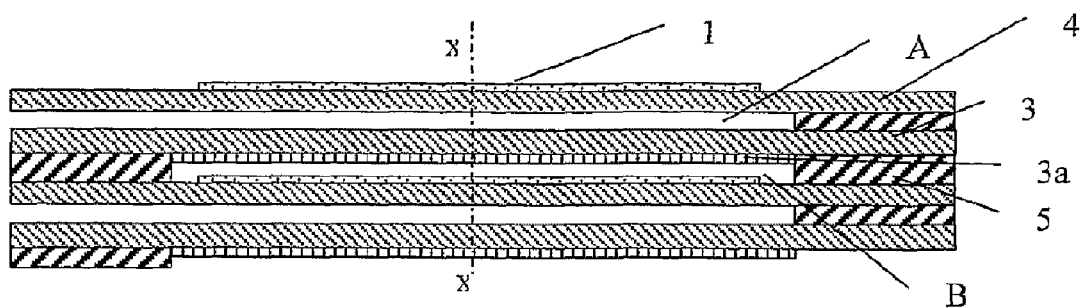
FIG. 10 shows an end view of a first fuel cell assembly with a step restriction diffuser extending from an interconnect plate.
Figure 11:
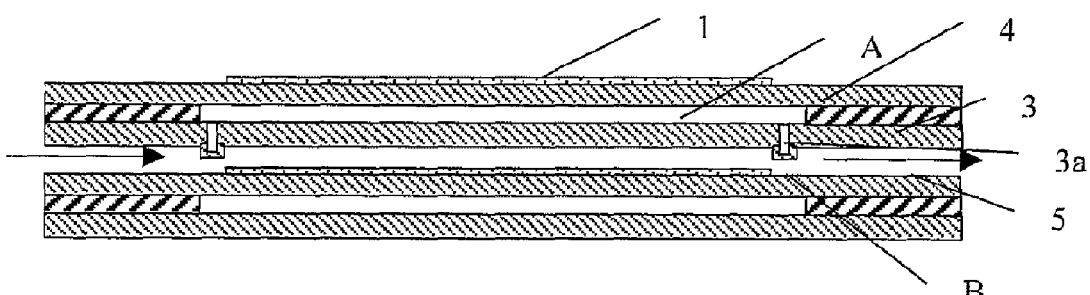
FIG. 11 shows a section taken along the line X-X of FIG. 10.
Figure 15:
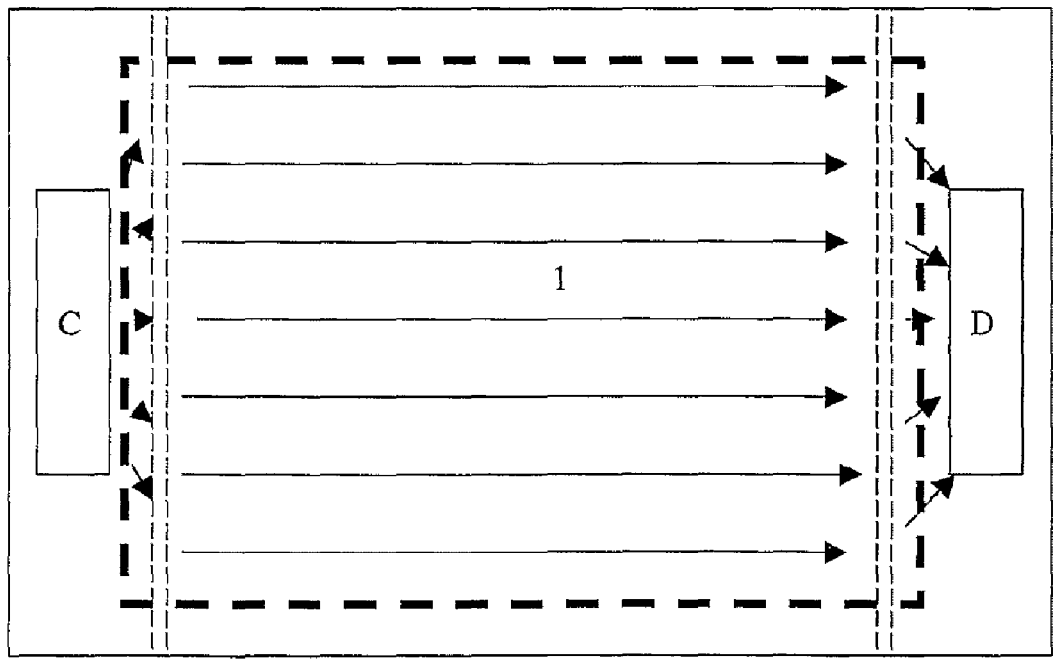
FIG. 15 shows a plan view of the first fuel cell of FIGS. 10 and 11, arrows indicating gas flow path and generally uniform gas flow over the electrode surface.

As can be seen from FIGS. 10 and 11, a first fuel cell assembly with a pair of restrictors 3A is as per the above embodiments, with an anode, electrolyte and cathode arrangement 1 deposited upon metal substrate 4, a fuel flowpath A and an air flow path B, and electrically insulating gaskets 5. Current collectors are not shown in FIGS. 10-13 for the sake of simplicity. The fuel cell has (FIG. 15) an air inlet port C, and an outlet port D. The dashed line indicates the perimeter of the second electrode. In use, air enters the fuel cell through port C, and travels towards outlet port D. However, step restriction 3A causes the gas flow to spread across the width of the fuel cell and thus generates a generally uniform gas flow across the second electrode area. At the outlet port D end of the fuel cell, a second step restriction 3A limits the preferential exiting of gas from the central region of the fuel cell, allowing gas from the non-central regions of the fuel cell to exit, maintaining the generally uniform gas flow across the second electrode area.

Figure 14:
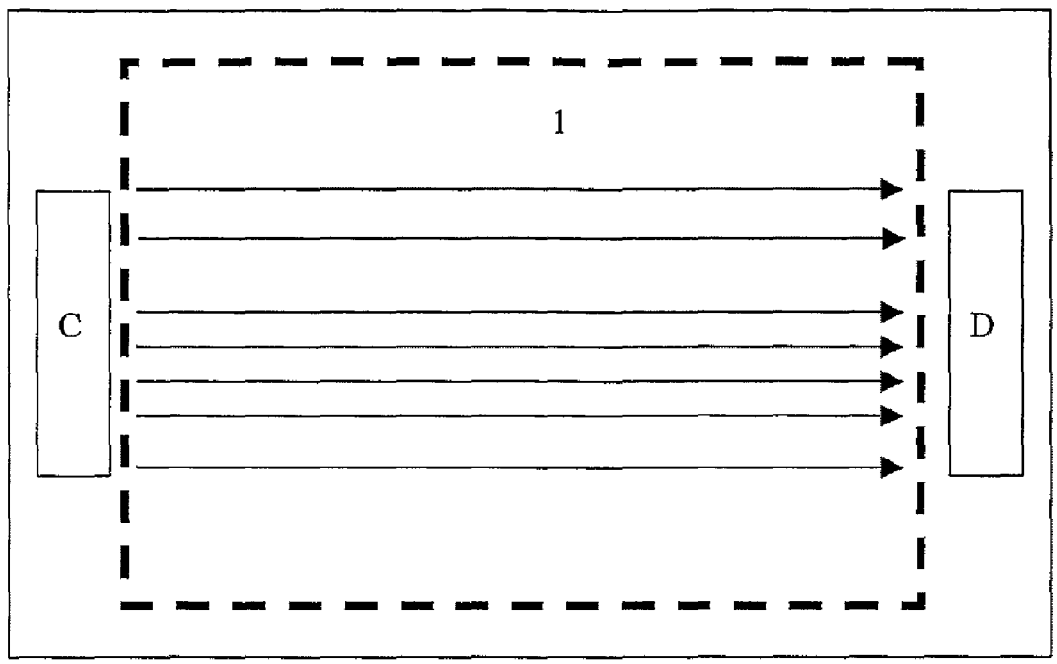
FIG. 14 shows a plan view of a fuel cell not having restrictors, arrows indicating gas flow path and channelling effect from gas inlet to gas outlet.

As can be seen from FIG. 14, in an embodiment without a restriction such as step restrictions 3A, gas flow preferentially occurs along the central region of the fuel cell, causing "dead" zones outside of the central region of the fuel cell. The electrochemical activity of the fuel cell is severely limited in these "dead" zone areas.

In particular, the step restrictions of FIGS. 10, 11 and 14 are capable of providing a greatly reduced (sub 1000 Pa) electrode area pressure drop when compared to alternative embodiments (below).

Figure 12:
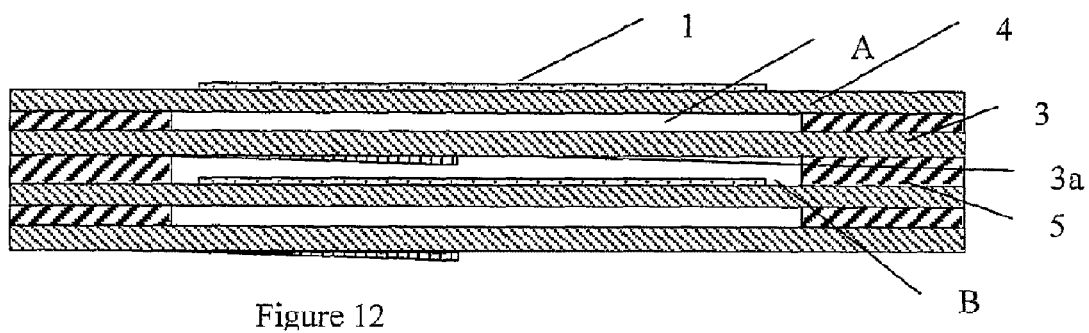
FIG. 12 shows an end view of a second fuel cell assembly with a V-shaped restriction.
Figure 13:
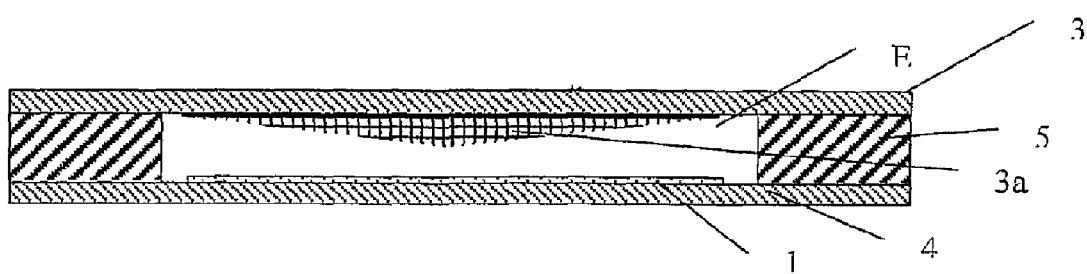
FIG. 13 shows a partial blow-up of FIG. 12

In the embodiment shown in FIGS. 12 and 13, the aerodynamic gap E between the cathode and the interconnect plate 3, defined by gasket 5 is 0.6 mm. The formed restrictor 3A narrows this gap to 0.3 mm in the centre, tapering to the full 0.6 mm at the edges. In other embodiments (not shown), the degree of narrowing and the dimensions involved are modified as appropriate for the specific applications.

Figure 16:
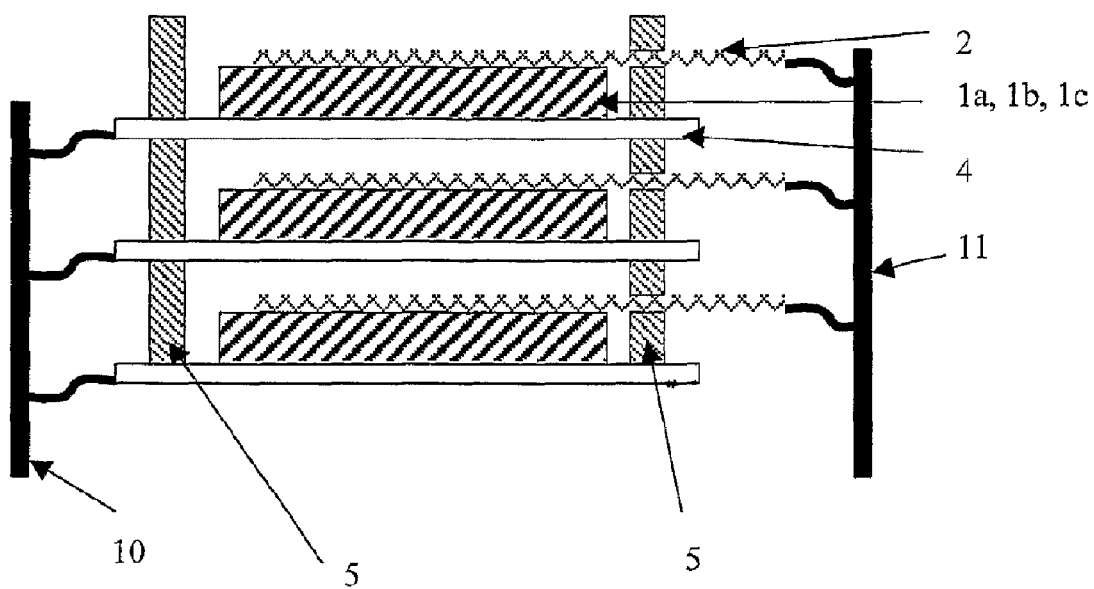
FIG. 16 shows a side view of a fuel cell stack configured for parallel electrical connection of individual fuel cells.
Figure 17:
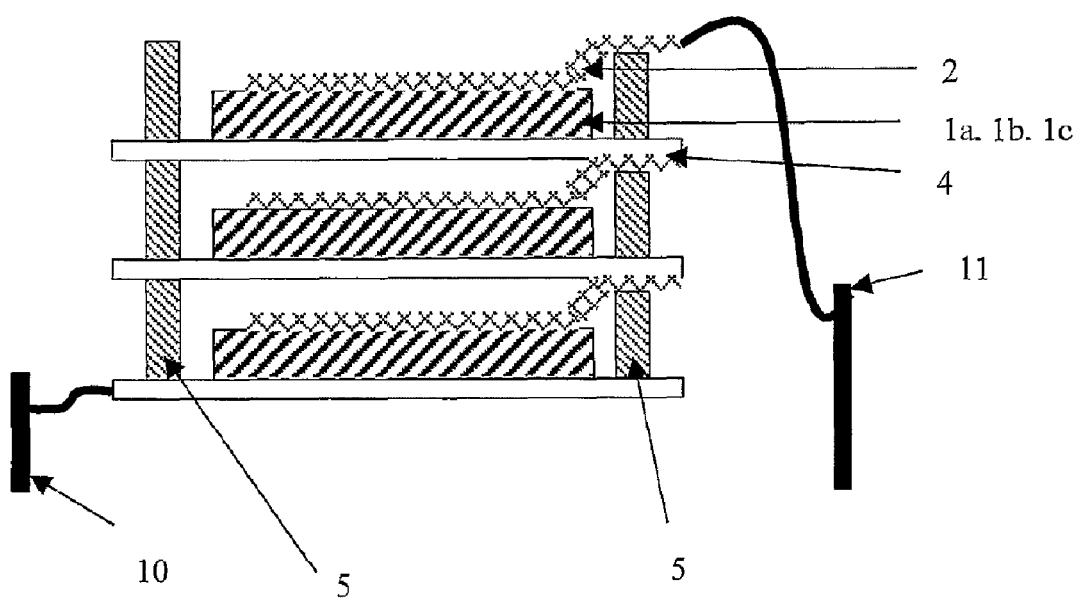
FIG. 17 shows a side view of a fuel cell stack configured for series electrical connection of individual fuel cells.

Examples of parallel and series electrical arrangements of fuel cells in fuel cell stacks are shown in FIGS. 16 and 17. FIG. 16 shows a section of a part of a fuel cell stack, and as can be seen the general arrangement as described previously is employed with an anode 1a, electrolyte 1b and cathode 1c (collectively referred to as reference numeral 1) being deposited upon a first metal substrate (electrically conductive base/interconnect) 4 which provides via a porous region a fuel flow to the bottom layer (i.e. the anode 1a), and electrically non-conductive gaskets 5, the first metal substrate 4 and an adjacent second metal substrate 4/end plate (not shown) defining a volume within which the oxidant flows and contacts the upper layer (i.e. cathode 1c).

Each current collector 2 is deposited upon cathode 1c and instead of being in direct electrical contact with the second metal substrate 4/end plate (not shown) above, it in fact extends through the gasket 5 to a current conductor 11. Thus, each of the current collectors 2 are connected in parallel to current conductor 11.

The metal substrate layers 4 similarly extend beyond the gaskets 5 and connect in parallel to current conductor 10. The electrical circuit is completed between current conductors 10 and 11, resulting in a circuit with fuel cells arranged in parallel.

FIG. 17 shows an alternative arrangement in which the fuel cells are arranged electrically in series. Current conductor 10 is in electrical contact with a bottom metal substrate 4, and each layer of the fuel cell stack is then arranged with the anode 1a, electrolyte 1b and cathode 1c (collectively referred to as reference numeral 1) being deposited upon a metal substrate (electrically conductive base/interconnect) 4 which provides via a porous region a fuel flow to the bottom layer (i.e. the anode 1a), and electrically non-conductive gaskets 5, the metal substrate 4 and an adjacent metal substrate 4/end plate (not shown) defining a volume within which the oxidant flows and contacts the upper layer (i.e. cathode 1e).

Each current collector 2 is deposited upon cathode 1c and extends into gasket 5 where it is in direct electrical contact with the metal substrate 4/end plate (not shown) above. From the top layer of the fuel cell stack, the current collector is in direct electrical contact with current conductor 11.

The electrical circuit is completed between current conductors 10 and 11, resulting in a circuit with fuel cells arranged in series.

FIG. 18 shows a section of a side view of a fuel cell stack layer with an adjacent interconnect plate 105 where the anode 102, electrolyte 103 and cathode 104 that includes the porous region of the pressureless current collector, is mounted on metal substrate 101. The metal substrate 101 is made up of porous regions 112 and non-porous regions 113. Metal substrate 101 is mounted on a metal interconnect plate 105 with a spacer layer 106 in-between the substrate 1101 and the interconnect plate 105 where a hermetic seal in the form of a weld 107 joins these layers together. Current collector extension 109 is pinned between non-conductive spacer 108 and a flat area on the interconnect plate 105. The structure allows for a volume 111 to be created between the substrate 101 and the interconnect plate 105 and a volume 110 to be created between the electrode 2 containing the porous part of the pressureless current collector 104 and the interconnect plate 105. In-use, volume 111 contains the reactant fuel gases and volume 110 contains the oxidant gas.

FIG. 19 follows the same layout as that for FIG. 18 but shows an alternative design for the interface between interconnect plate 105 and current collector extension 109. Interconnect plate 105 has a series of flat faced ridges 114 formed into its surface that are designed to allow the compressive force to be transmitted down through the stack between stack layers without the interconnect plate 105 interface area bowing as a result of the compressive stress. This figure also shows a dimple structures that placed on both sides of the interconnect plate. In this embodiment, there is a flat topped dimple 115 shown on the second electrode side, and a domed dimple 116 shown on the side between interconnect plate 105 and the metal substrate 101. The dimples are opposite each other and do not touch the opposing surfaces.

FIG. 20 shows the same aspect as that for FIG. 18 although the ridged features as seen on the interconnect plate of FIG. 19 are instead incorporated into electrically non-conductive spacer 117. The electrically non-conductive spacer 117 is formed by casting, moulding or extruding.

FIG. 21 shows the same aspect as that for FIG. 18 only in that the shape of the interconnect contact areas vary depending on the position of the interconnect plate in the fuel cell stack.

FIG. 22 shows a partially exploded perspective view of part of a fuel cell stack system assembly 1000. As can be seen, a repeating layer structure is provided comprising repeats of:
  Electrically conductive interconnect plate 1001;
  Electrically conductive spacer 1004;
  Electrically conductive substrate 1003 having mounted on it anode, electrolyte, cathode and electrically conductive current collector 1012; and
  Electrically non-conductive structure comprising electrically non-conductive spacer 1010, fuel inlet gasket 1005 and exhaust-side gasket 1002.

Electrically conductive interconnect plate 1001, electrically conductive spacer 1004, electrically conductive substrate 1003 are fabricated from ferritic stainless steel. Similarly, electrically conductive current collector 1012 is fabricated from ferritic stainless steel.

Electrically non-conductive spacer 1010 is CGO. Gaskets 1002 and 1005 are vermiculite.

The anode is a Nickel CGO. The electrolyte is a CGO. The cathode is an LSCF.

The fuel cell stack system assembly 1000 has an inlet side and an outlet side. On the inlet side, a fuel inlet manifold is defined by cut-out openings 1001A, 1004A, 1003A and 1005A. Fuel then flows at opening 1001A into the volume defined by the upper surface of electrically conductive interconnect plate 1001, electrically conductive spacer 1004, and the underside of electrically conductive metallic substrate 1003. Upon entry into this volume, the fuel gas flow encounters baffle 1017 which acts to encourage non-linear gas flow within the volume. Electrically conductive interconnect 1001 is also provided with upwardly-facing dimples 1014 and downwardly-facing dimples 1015. Downwardly-facing dimples 1015 are provided with a generally flat face such that if they contact the top surface of fuel cell layers and embedded current collector 1012 in the event of mechanical shock/stress, they act to mechanically stabilise the fuel cell stack assembly whilst minimising contact pressure and damage. Dimples 1014 and 1015 also act to mechanically stabilise the fuel cell and to encourage non-linear gas flow and thus enhance fuel cell stack assembly 1000 operational performance.

Fuel flow to the anode is achieved through pores in electrically conductive metal substrate 1003, and reacted fuel exhausts back into the aforementioned volume.

On the outlet side, an exhaust fuel manifold is defined by cut-out openings 1001B, 1002B, 1003B and 1004B. Thus, a closed fuel flow path and a plenum is defined.

In FIG. 22, fuel flow is indicated by arrows 1007 (fuel inlet flow) and 1009 (reacted fuel exhaust flow).

With regard to oxidant flow, an open oxidant flow path is provided—there is no manifolding for oxidant flow on the inlet side, and instead oxidant is able to flow freely from the volume external to the fuel cell stack system assembly at the inlet side into the volume defined between the upper surface of the electrically conductive metallic substrate 1003, the fuel inlet gasket 1005, the exhaust-side gasket 1002 and the underside of electrically conductive interconnect plate 1001.

On the outlet side, an exhaust oxidant manifold is defined by cut-out openings 1001C, 1002C, 1003C and 1004C.

In FIG. 22, oxidant flow is indicated by arrows 1006 (oxidant side feed flow) and 1008 (oxidant side exhaust flow).

Thus, discrete fuel and oxidant flow paths are defined, and in particular the oxidant flow path includes an open oxidant inlet, allowing for the simple and convenient flow of the large volumes of oxidant required by fuel cell stack assemblies, reducing the mass flow problems encountered with prior art fuel cell stack assemblies, problems which necessitate the consumption of large amounts of power in the provision of blowers.

When the fuel cell stack assembly 1000 is operating, a potential difference is generated across the anode, electrolyte and cathode. Specifically, the anode (not shown) is in electrical contact with the upper porous surface of the electrically conducting substrate 1003. The electrolyte (not shown) is then in electrical contact with the anode underneath it and the cathode on top of it. The cathode is in electrical contact with the current collector (not shown). Current is removed from the cathode and current collector by way of current collector extensions 1011 which extend away from the anode, cathode and electrolyte in a plane generally parallel with the plane of the anode, cathode and electrolyte beyond a perimeter defined by the anode, cathode and electrolyte.

In order to electrically insulate the current collector extensions 1011 from the electrically conductive substrate 1003, electrically non-conductive spacer 1010 is located between them.

Electrical current is then transferred to adjacent electrically conductive interconnect plate 1001 via electrically conductive ridges 1013 which consists a plurality of ridges extending longitudinally along the electrically conducting interconnect plate from the inlet side to the outlet side. Each ridge 1013 extends downwards from electrically conductive interconnect 1001 such that it contacts current collector extensions 1011. The use of a plurality of ridges 1013 helps provide the point pressures required to effect good electrical contact and also helps ensure that a good gas seal is achieved in order that gas flow within the fuel cell stack assembly 1000 is well controlled.

In order to further enhance sealing, the locating of the exhaust side gasket is assisted by the provision of nipples 1018 which can provide the necessary contact with the adjacent electrically non-conductive spacer 1010 and current collector extensions 1011, whilst minimising contact and thus minimising any contact pressures which may result during thermal cycling of the fuel cell stack assembly 1000.

Electrically conductive endplates (not shown) are provided at either end of the fuel cell stack assembly and act to define the fuel and oxidant flow path volumes at either end and allow electrical current to be drawn off.

An electrical circuit is completed between the endplates (not shown) by wire 1020 (not shown). A load (not shown) is placed upon this electrical circuit.

In order to provide thermal shielding for other fuel cell stack assembly 1000 components, thermal insulation is placed at either end of the fuel cell stack assembly.

Finally, the fuel cell stack assembly 1000 is compressed by the provision of a non-solid compression frame which has a non-solid central region corresponding to the area within the perimeter of the anode, cathode and electrolyte, and which solid section extends beyond the perimeter of the area defined by the anode, cathode and electrolyte of each fuel cell stack assembly 1000 layer, and which thus extends over the electrically non-conductive spacers 1010, current collector extensions 1011 and electrically conductive ridges 1013. Compression bolts are provided in compression system feed holes 1016 and (on the outlet side) in out-out openings 1001C, 1002C, 1003C and 1004C. A compressive force is exerted upon the fuel cell stack assembly 1000. Notably, the use by the present invention of a compression frame as opposed to prior art compression plates results in a reduced thermal mass, meaning that the fuel cell stack assembly 1000 can be cycled more rapidly than prior art devices. This system also reduces the compression force which has to be exerted through the stack, thus reducing component costs and simplifying manufacturing.

This compressive force provides the required sealing. The compression bolts used are electrically insulated from the individual components 1001, 1002, 1003, 1004, 1005 in order to prevent shorting of the fuel cell stack assembly.

Thus, electrical contact is made with the current collector extensions without any need to contact or exert pressure upon the anode, electrolyte or cathode of the fuel cell stack assembly 1000 layer, whilst at the same time gas flow (particularly oxidant flow) is enhanced, and dimples 1014, 1015 provide for shock-resistance during use.

It will be appreciated that it is not intended to limit the present invention to the above embodiments only, other forms of the invention being readily apparent to the person of ordinary skill in the art without departing from the scope of the appended claims.

The invention claimed is:

1. A fuel cell stack assembly having at least one fuel cell stack including at least one fuel cell that comprises:
   an electrolyte layer defining first and second faces respectively in electrochemical contact with a first electrode and a second electrode;
   an electrically conductive substrate upon which said electrolyte and said electrodes are mounted, with the first electrode closest to the electrically conductive substrate and the second electrode farthest from the electrically conductive substrate;
   a flexible electrically conductive current collector having a portion joined to or mounted on or in said second electrode in electrical contact therewith;
   an electrically conductive interconnect separated from said portion of said current collector to provide a space therebetween for fluid flow, said electrically conductive current collector having at least one extension that projects outwardly beyond a perimeter defined by said first and second electrodes and said electrolyte;
   at least one electrically non-conductive gasket or spacer located outside of said perimeter,
   said electrically conductive substrate, said at least one electrically non-conductive gasket or spacer, said at least one current collector extension, and said electrically conductive interconnect defining a compressive load bearing structure outside of said perimeter; and compression means for exerting compressive force only upon said compressive load bearing structure outside of said perimeter.

2. A fuel cell stack assembly according to claim 1, wherein end plates are disposed around said at least one fuel cell stack, and wherein said compression means exerts said compressive force via peripheral portions of said end plates outside said perimeter.

3. A fuel cell stack assembly according to claim 1, wherein said fuel cell stack includes at least two of said fuel cells connected in series or parallel.

4. A fuel cell stack assembly according to claim 1, wherein said current collector extension is bent away from said portion of said current collector and is in electrical contact with said interconnect.

5. A fuel cell stack assembly according to claim 1, wherein the at least one fuel cell is a solid oxide fuel cell.

* * * * *

UNITED STATES PATENT AND TRADEMARK OFFICE
CERTIFICATE OF CORRECTION

PATENT NO. : 8,383,284 B2  Page 1 of 1
APPLICATION NO. : 12/162784
DATED : February 26, 2013
INVENTOR(S) : Selcuk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this
First Day of September, 2015

Michelle K. Lee
*Director of the United States Patent and Trademark Office*